(12) United States Patent
Kipke et al.

(10) Patent No.: US 8,722,833 B2
(45) Date of Patent: May 13, 2014

(54) MULTIMODAL POLYETHYLENE COMPOSITION, MIXED CATALYST AND PROCESS FOR PREPARING THE COMPOSITION

(75) Inventors: Jennifer Kipke, Hamburg (DE); Shahram Mihan, Bad Soden (DE); Rainer Karer, Kaiserslautern (DE); Harald Schmitz, Weinheim (DE)

(73) Assignee: Basell Polyolefine GmbH, Wesseling (DE)

( * ) Notice: Subject to any disclaimer, the term of this patent is extended or adjusted under 35 U.S.C. 154(b) by 687 days.

(21) Appl. No.: 12/448,449

(22) PCT Filed: Dec. 18, 2007

(86) PCT No.: PCT/EP2007/011113
§ 371 (c)(1),
(2), (4) Date: Jun. 19, 2009

(87) PCT Pub. No.: WO2008/077530
PCT Pub. Date: Jul. 3, 2008

(65) Prior Publication Data
US 2009/0306299 A1    Dec. 10, 2009

Related U.S. Application Data

(60) Provisional application No. 60/921,366, filed on Apr. 2, 2007.

(30) Foreign Application Priority Data

Dec. 22, 2006  (EP) .................................... 06026752

(51) Int. Cl.
| | | |
|---|---|---|
| C08L 23/06 | (2006.01) | |
| C08F 2/34 | (2006.01) | |
| C08F 10/02 | (2006.01) | |
| C08F 210/16 | (2006.01) | |
| C08L 23/08 | (2006.01) | |
| B01J 31/12 | (2006.01) | |

(52) U.S. Cl.
CPC . *C08L 23/06* (2013.01); *C08F 2/34* (2013.01); *C08F 10/02* (2013.01); *C08F 210/16* (2013.01); *C08L 23/0815* (2013.01); *B01J 31/12* (2013.01)
USPC ............................ 526/352; 502/102; 525/240

(58) Field of Classification Search
CPC ....... C08L 23/06; C08L 23/0815; C08F 2/34; C08F 10/02; C08F 210/16; B01J 31/12
USPC ........................................ 525/240, 352, 102
See application file for complete search history.

(56) References Cited

U.S. PATENT DOCUMENTS

| | | | |
|---|---|---|---|
| 3,242,150 A | 3/1966 | Scoggin | |
| 3,248,179 A | 4/1966 | Norwood | |
| 5,565,534 A | 10/1996 | Aulbach et al. | |
| 5,698,642 A | 12/1997 | Govoni et al. | |
| 5,710,297 A | 1/1998 | Weller et al. | |
| 5,786,432 A | 7/1998 | Küber et al. | |
| 5,882,750 A | 3/1999 | Mink et al. | |
| 5,929,264 A | 7/1999 | Rohrmann et al. | |
| 5,942,367 A * | 8/1999 | Watanabe et al. | 430/170 |
| 5,955,555 A | 9/1999 | Bennett | |
| 6,194,341 B1 | 2/2001 | Canich et al. | |
| 6,218,472 B1 * | 4/2001 | Debras et al. | 525/191 |
| 6,407,192 B1 * | 6/2002 | Debras et al. | 526/352 |
| 6,455,642 B1 | 9/2002 | Myhre et al. | |
| 6,462,155 B1 * | 10/2002 | Okuda | 526/161 |
| 7,427,649 B2 | 9/2008 | Berthold et al. | |
| 2002/0026012 A1 | 2/2002 | Mecking | |
| 2003/0191251 A1 * | 10/2003 | McGrath | 526/64 |
| 2005/0012235 A1 * | 1/2005 | Schregenberger et al. | 264/83 |
| 2006/0052542 A1 | 3/2006 | Berthold et al. | |
| 2006/0074193 A1 | 4/2006 | Berthold et al. | |
| 2006/0074194 A1 | 4/2006 | Berthold et al. | |

(Continued)

FOREIGN PATENT DOCUMENTS

| | | |
|---|---|---|
| EP | 0416815 | 8/1990 |
| EP | 350339 | 8/1995 |

(Continued)

OTHER PUBLICATIONS

Yasushi Tohi et al., "Polyethylenes with Uni-, Bi-, and Trimodal Molecular Weight Distributions Produced with a Single Bis(phenoxy-imine)zirconium Complex," *Macromolecules*, vol. 36, No. 3, Feb. 11, 2003, pp. 523-525.
*High Polymers*, vol. 20, Raff and Doak, Interscience Publishers, John Wiley & Sons, 1965, p. 443.
Louis F. Fieser and Mary Fieser, *Lehrbuch der Organischen Chemie*, 3rd Revised Edition, Verlag Chemie, Weinheim, 1957.
Helga Wiesenfeldt et al., "ansa-Metallocene derivatives," *Journal of Organometallic Chemistry*, 369, 1989, pp. 359-370.
Steven H. Strauss, "The Search for Larger and More Weakly Coordinating Anions," *Chem. Rev.*, 1993, 93, pp. 927-942.
Jan Bussink et al., "Polymer Blends," *Ullmann's Encyclopedia of Industrial Chemistry*, 6th Edition, 2000, Electronic Release.
Yaofeng Chen et al. (Chen, Qian, Don, and Sun), "Halogen-Substituted 2,6 Bis(imino)pyridyl Iron and Cobalt Complexes: Highly Active Catalysts for Polymerization and Oligomerization of Ethylene," *Organometallics*, 2003, 22, pp. 4312-4321.

*Primary Examiner* — Mark Kaucher

(57) ABSTRACT

A multimodal polyethylene composition comprising at least three ethylene polymer fractions having distinct molecular weights or comonomer contents, the at least three ethylene polymer fractions comprising at least one first ethylene polymer fraction having a first molecular weight, at least one second ethylene polymer fraction having a second molecular weight higher than the first molecular weight, and at least one third ethylene polymer fraction having a third molecular weight higher than the first molecular weight, wherein the at least one first ethylene polymer fraction and the at least third ethylene polymer fraction are prepared by the use of a first and, respectively, third catalyst of the single site type.

6 Claims, No Drawings

(56) References Cited

U.S. PATENT DOCUMENTS

| | | |
|---|---|---|
| 2007/0043177 A1 | 2/2007 | Michie, Jr. et al. |
| 2007/0213205 A1 | 9/2007 | Mihan |
| 2008/0139750 A1 | 6/2008 | Berthold et al. |
| 2008/0166535 A1 | 7/2008 | Berthold et al. |
| 2008/0199674 A1 | 8/2008 | Berthold et al. |
| 2009/0105428 A1 | 4/2009 | Mihan |

FOREIGN PATENT DOCUMENTS

| | | |
|---|---|---|
| EP | 0561479 | 11/1996 |
| EP | 0632063 | 8/1998 |
| EP | 0129368 | 4/2002 |
| EP | 1428854 | 6/2004 |
| WO | WO 2004/067586 | 8/2004 |
| WO | WO 2006/045737 | 5/2006 |

* cited by examiner

MULTIMODAL POLYETHYLENE COMPOSITION, MIXED CATALYST AND PROCESS FOR PREPARING THE COMPOSITION

CROSS-REFERENCE TO RELATED APPLICATION:

This application is the U.S. national stage under 35 U.S.C. §371 International Application PCT/EP2007/011113, filed Dec. 18, 2007, claiming priority to EP Patent Application No. 06026752.3, filed Dec. 22, 2006, and provisional U.S. Appl. No. 60/921,366, filed Apr. 2, 2007; the disclosures of International Application PCT/EP2007/011113, EP Patent Application No. 06026752.3, and provisional U.S. Appl. No. 60/921,366, each as filed, are incorporated herein by reference

FIELD OF THE INVENTION

The present invention relates to a novel multimodal polyethylene composition, to a process and to a mixed catalyst system for the preparation thereof. More particularly, the multimodal polyethylene composition of the invention comprises at least three ethylene polymer fractions having distinct molecular weights or comonomer contents.

In the present description and in the following claims, the expression "molecular weight", except where otherwise indicated, is used to indicate the weight average molar mass $M_w$.

The present invention also relates to a film comprising such a multimodal polyethylene composition. An exemplary preferred application of the multimodal polyethylene composition of the invention is that of polyethylene films, more particularly to high density polyethylene (HDPE) films.

In the present description and in the following claims, the expression "high density film" is used to indicate a film having a density above 0.940 g/cm³.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Although a preferred application of the multimodal polyethylene composition of the invention is that of films, the composition is also suitable to prepare fibers, moldings, such as for example articles manufactured by blow molding, injection molding or compression molding, and pipes.

PRIOR ART

Multimodal polyethylene compositions are known, whose properties essentially depend on the nature of the ethylene polymer fractions of which the compositions are made, as well as on the way in which the polyethylene composition is prepared and, in particular, on the kind of process used to prepare the same. Among the different steps used to carry out the process, a key role is played by the catalyst system selected in the (co)polymerization step(s) which is(are) carried out to obtain the polyethylene composition starting from the monomers, i.e. from ethylene and, optionally, one further comonomer or more further comonomers.

In the present description and in the following claims, unless otherwise indicated, the term "polymer" is used to indicate both a homopolymer, i.e. a polymer comprising repeating monomeric units derived from equal species of monomers, and a copolymer, i.e. a polymer comprising repeating monomeric units derived from at least two different species of monomers, in which case reference will be made to a binary copolymer, to a terpolymer, etc. depending on the number of different species of monomers present.

In an analogous manner, unless otherwise specified, in the present description and in the following claims, the term "polyethylene" is used to indicate both an ethylene homopolymer and a copolymer of ethylene and at least a further comonomer.

In an analogous manner, unless otherwise indicated, the term "polymerization" is used to indicate both a homopolymerization, i.e. a polymerization of repeating monomeric units derived from equal species of monomers, and a copolymerization, i.e. a polymerization of at least two different species of monomers.

In the present description and in the following claims, the term "ethylene homopolymer" is used to indicate a polymer comprising repeating ethylene monomeric units, possible comonomers of different species being present in an amount lower than or equal to 0.3 mol %.

In the present description and in the following claims, the term "copolymer of ethylene" is used to indicate a polymer comprising repeating ethylene monomeric units and at least one further comonomer of different species, said at least one comonomer of different species being present in an amount higher than 0.3 mol %.

The molecular weight of polyethylene is generally increased with the aim of enhancing the mechanical properties thereof, such as for example, tensile strength, ultimate elongation, impact strength, puncture resistance and toughness. Such properties are important in a number of applications, for example in film applications.

However, increasing the molecular weight of the polyethylene usually decreases the processability of the same.

For example, bimodal polyethylene compositions comprising a first polyethylene fraction having a relatively high molecular weight and a second polyethylene fraction having a relatively lower molecular weight are known, in which the desirable characteristics due to the relatively high molecular weight polyethylene fraction can be substantially retained while improving the processability of the composition. To produce such compositions, various alternative methods are known, including post reactor or melt blending, use of multistage reactors, in which distinct average molecular weight components can be produced in each reactor, as well as catalysis in a single reactor by using a catalyst able to produce such a composition.

Among the prior art documents relating to bimodal polyethylene compositions, WO2004/101674 for example discloses a multimodal polyethylene composition suitable for preparing films produced by the use of a Ziegler-Natta type catalyst in two fluidized gas phase reactors arranged in series.

WO99/51649 discloses polymer films blown from high density polyethylene compositions produced by the use of a Ziegler-Nafta type catalyst in multireactor processes comprising combinations of slurry and gas phase reactors or gas phase reactors arranged in series.

A polyethylene resin of bimodal molecular weight distribution produced catalytically in a single reactor is disclosed, for example, by WO97/02294. The resin comprises a high molecular weight fraction and a low molecular weight fraction formed in situ in a single reactor by a catalyst. The relatively low molecular weight fraction is produced by a metallocene transition metal catalyst component, while the relatively high molecular weight fraction is produced by a non-metallocene transition metal catalyst component.

Document WO2005/103100 discloses a polyethylene having a polydispersity $M_w/M_n$ of from 6 to 100, a density of from 0.89 to 0.97 g/cm$^3$, a weight average molar mass $M_w$ of from 5000 g/mol to 700000 g/mol, from 0.01 to 20 branches/1000 carbon atoms and at least 0.5 vinyl groups/1000 carbon atoms, in which 5-50% by weight of the polyethylene having the lowest molar masses have a degree of branching of less than 10 branches/1000 carbon atoms and 5-50% by weight of the polyethylene having the highest molar masses have a degree of branching of more than 2 branches/1000 carbon atoms. The polyethylene disclosed by WO2005/103100, which is suitable for preparing fibers, moldings, pipes, films or polymer mixtures, has a bimodal short chain branching distribution and is prepared in a single reactor in the presence of a mixed catalyst system comprising two different polymerization catalysts, namely a first catalyst based on a monocyclopentadienyl complex of a metal of groups 4-6 of the Periodic Table of Elements whose cyclopentadienyl is substituted by an uncharged donor or a hafnocene, and a second catalyst based on an iron component having a tridentate ligand. Specific examples of polyethylene are given which are prepared by a mixture of two catalysts of the above-mentioned type, for example by a mixture of bis(n-butylcyclopentadienyl) hafnium dichloride and of 2,6-bis[1-2,4-dichloro-6-methylphenylimino)ethyl]pyridine iron(II) dichloride, or a mixture of [1-(8-quinolyl)indenyl]chromium(III) dichloride and of 2,6-bis[1-(2,4-dichloro-6-methylphenylimino)ethyl]pyridine iron(II) dichloride.

Polyethylene having a bimodal molecular weight distribution produced catalytically in a single reactor wherein both the relatively low molecular weight fraction and the relatively high molecular weight fraction are produced by a metallocene catalyst is also known.

The multimodal polyethylene compositions of the prior art, however, have a molecular weight distribution which is not adequately adjustable in a flexible manner so as to cover the whole range of products to the preparation of which the polyethylene composition is intended.

In the attempt to ensure that the molecular weight distribution may be more flexibly adjusted as a function of the properties of the articles to be manufactured, polyethylene having a trimodal molecular weight distribution has been developed comprising a first ethylene polymer fraction having a first molecular weight, a second ethylene polymer fraction having a second molecular weight higher than said first molecular weight, and a third ethylene polymer fraction having a third molecular weight higher than said first molecular weight.

So, for example, Fujita et al. disclose the preparation of polyethylene having a monomodal, bimodal or trimodal molar mass distribution by using zirconium complexes bearing two phenoxy-imine ligands (Macromolecules 36(3), pages 523-525, 2003). These complexes possess different isomers arising from coordinating modes of ligands which may result in multiple active species. The molar mass distribution of the trimodal polyethylene disclosed by Fujita et al. is however dependent from the activity of the different isomers possessed by the complex, and thus cannot be adjusted in a flexible manner.

On the other side, with more specific reference to the field of films, the Applicant noted that the prior art films made of the known multimodal polyethylene compositions, independently from the way by which these compositions are prepared, are not sufficient impermeable to water vapor due to the presence of gels or to an unbalanced crystalline orientation and, as such, are not fit to meet the most exigent requirements of the film market and industry.

There is the need, in fact, which is particularly felt in the food industry, to maintain some products well protected by water vapor. By way of an illustrative example, cereals and crackers are products which should be preserved from the contact with moisture as long as possible in order to remain crispy over also long storage time periods. So, products having similar requirements are packaged with film packaging, which, in order to meet the above-mentioned need, should act as an effective barrier to water vapor or, said it in another way, should have a limited water vapor transmission rate (WVTR).

SUMMARY OF THE INVENTION

In view of the above, the Applicant has perceived the need of providing a multimodal polyethylene composition having a predetermined molecular distribution which is capable to be adjusted in a flexible manner depending on the end application of the composition, such as to prepare a broad range of products, such as for example films, fibers, moldings, such as for example blow molded, injection molded or compression molded articles, and pipes.

These multimodal polyethylene compositions should be preferably prepared by using a single reactor.

Furthermore, the Applicant has perceived the need of providing a polyethylene having an improved water vapor resistance without impairing the mechanical properties and the processability thereof.

In other words, the Applicant has perceived a general need of providing multimodal polyethylene compositions which can readily be tailored depending on the end application thereof, while, with specific reference to the field of films, the Applicant has perceived the need of providing a polyethylene composition, as well as a process for the preparation thereof and a film comprising such a composition which, in sharp contrast to the prior art, exerts an effective water vapor barrier, while maintaining or improving dart drop impact, tear propagation resistance and bubble stability.

Accordingly, a first object of the present invention is that of providing a multimodal polyethylene composition comprising at least three polymer fractions having distinct molecular weights whose molecular weight distribution can be adjusted in a flexible manner.

A second object of the present invention is that of providing a polyethylene composition having a suitable processability, particularly in terms of bubble stability, while simultaneously achieving an improved balance between both water vapor barrier properties and mechanical properties, in particular in terms of dart drop impact and tear propagation resistance. Such object, as discussed above, is a problem particularly felt in film applications.

A further object of the present invention is that of providing a mixed catalyst system permitting to prepare a multimodal composition in a single reactor.

Surprisingly, the Applicant has found that it is possible to achieve the above-mentioned first object by providing a polyethylene composition comprising at least three ethylene polymer fractions having predetermined distinct molecular weights and predetermined distinct comonomer contents, in which two of said ethylene polymer fractions are prepared by the use of respective catalysts, preferably of the non-single site type, and one of said ethylene polymer fractions is prepared by the use of a catalyst of the single site type.

In the present description and in the following claims, the expression "single site catalyst" is used to indicate a catalyst comprising a coordination metal complex capable of polymerizing an olefin monomer, preferably ethylene, and optionally at least one comonomer, preferably an alpha-olefin, so as to obtain a polyolefin, respectively a polyethylene, having a narrow molecular weight distribution.

In the present description and in the following claims, a polyolefin has a narrow molecular weight distribution when the polyolefin has a polydispersity lower than or equal to 5, preferably in the range from 1.5 to 5.

By way of illustrative example, metallocene catalysts are single site catalysts. Single-site catalysts may comprise for example compounds selected in the group of metallocenes (including cyclopentadienyl derivatives, optionally substituted with cyclic compounds), phenoxyimin derivatives, as well as neutral or charged bidentate or tridentate nitrogen ligands with 2 or 3 coordinating nitrogen atoms.

In the present description and in the following claims, the expression "metallocene catalyst" is used to indicate a catalyst comprising at least one cyclopentadienyl transition metal complex and, generally, a compound having the following formula:

wherein Cp is a substituted or unsubstituted cyclopentadienyl ring or derivative thereof, M is a transition metal, preferably a Group 4, 5, or 6 metal, R is a hydrocarbyl group or hydrocarboxy group having from one to twenty carbon atoms, and X is a halogen. Generally, the metallocene-type catalyst compounds referenced herein include half and full sandwich compounds having one or more bulky ligands bonded to at least one metal atom. Typical metallocene-type compounds are generally described as containing one or more bulky ligand(s) and one or more leaving group(s) bonded to at least one metal atom. For the purposes of this description and appended claims, the term "leaving group" is any ligand that can be abstracted from a bulky ligand metallocene-type catalyst compound to form a metallocene-type catalyst cation capable of polymerizing one or more olefins.

The bulky ligands are generally represented by one or more open or fused ring(s) or ring system(s) or a combination thereof. These ring(s) or ring system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 16 and the lanthanide or actinide series of the Periodic Table of Elements. Preferably the metal is a transition metal from Groups 4 through 12, more preferably 4, 5 and 6, and most preferably the metal is from Group 4.

In the present description and in the following claims, the expression "non-single site catalyst" is used to indicate a catalyst giving rise to a polyolefin having a polydispersity higher than 5. By way of illustrative example, transition metal coordination compounds including at least one ligand of the non-metallocene type, Ziegler-Natta catalysts and Phillips catalysts may be considered as examples of non-single site catalysts. As is known, Ziegler-Natta catalysts generally consist of a complex of a base metal alkyl or halide with a transition metal salt, while Phillips catalysts are generally chromium oxide based catalysts.

Therefore, according to a first aspect thereof, the present invention relates to a polyethylene composition comprising at least three ethylene polymer fractions having distinct molecular weights and predetermined comonomer contents as defined in appended claim 1.

More particularly, according to a first aspect thereof, the present invention relates to a polyethylene composition comprising:
a) at least one first ethylene polymer fraction having:
   a1) a first molecular weight,
   a2) a first comonomer content lower than or equal to 0.3 mol %, and
   a3) a first density comprised between 0.950 and 0.986 g/cm$^3$;
b) at least one second ethylene polymer fraction having:
   b1) a second molecular weight higher than said first molecular weight,
   b2) a second comonomer content higher than 0.3 mol %, and
   b3) a second density comprised between 0.880 and 0.960 g/cm$^3$;
c) at least one third ethylene polymer fraction having:
   c1) a third molecular weight higher than said first molecular weight,
   c2) a third comonomer content lower than or equal to 0.3 mol %, and
   c3) a third density comprised between 0.940 and 0.975 g/cm$^3$;
each one of said mol % of the first, second and third comonomer content being based on the total comonomer content of the composition, wherein said at least one first ethylene polymer fraction and said at least one third ethylene polymer fraction are prepared by the use of a first catalyst, preferably of the non-single site and, respectively, of a third catalyst, preferably of the non-single site type, and said at least one second ethylene polymer fraction is prepared by the use of a second catalyst which is of the single site type.

In other words, at least two fractions of the above-mentioned at least three ethylene polymer fractions comprise two respective ethylene homopolymers each having a comonomer content lower than or equal to 0.3 mol %, preferably lower than or equal to 0.2 mol %, more preferably not higher than 0.1 mol %, still more preferably not higher than 0.05 mol %, and different molecular weights, while one fraction of the above-mentioned at least three of ethylene polymer fractions comprises an ethylene copolymer having a comonomer content higher than 0.3 mol %, preferably from above 0.3% to 10 mol %, more preferably from above 0.3% to 10 mol %, still more preferably from above 0.4 mol % to 6 mol %, still more preferably from 0.5 mol % to 3 mol %, still more preferably from 0.5 mol % to 2, and a molecular weight higher than the molecular weight of the homopolymer having the lowest molecular weight.

In other words, the polyethylene composition of the invention comprises:
at least two fractions of the above-mentioned at least three ethylene polymer fractions including two respective ethylene homopolymers, each one preferably having a relatively broader molecular weight distribution, the at least two ethylene homopolymers preferably having two respective preferred polydispersity values from to 2 and 10 and, respectively, greater than 8, and more preferred values described in the following, and
at least one fraction of the above-mentioned at least three of ethylene polymer fractions including an ethylene copolymer having a relatively narrower molecular weight distribution, the at least one ethylene copolymer preferably having a preferred polydispersity value lower than or equal to 5, more preferably from 1.5 to 5, and more preferred values as described in the following.

Thanks to the above-mentioned combination of features, the multimodal polyethylene composition of the invention can be advantageously used to manufacture polyethylene articles for a number of distinct end applications, such as for example films, fibers, moldings, for example blow molded articles, injection molded articles, compression molded articles, and pipes.

More particularly, the multimodal polyethylene composition of the invention can be advantageously tailored to the desired the end application by adjusting the molecular weight distribution and comonomer distribution which, in turn, can be adjusted in a simple manner, by way of illustrative example, by setting the molecular weight distributions of the first ethylene polymer fraction and of the third ethylene polymer fraction, which are both ethylene homopolymers, at respective predetermined distributions and by adjusting the molecular weight of the second ethylene polymer fraction, which is a copolymer of ethylene.

Furthermore, with reference to films comprising the multimodal polyethylene composition of the invention, an improved balance between water vapor barrier properties and mechanical properties is advantageously achieved. Without being bound to a particular theory, it is deemed that this advantage is attained thanks to the fact that the composition of the invention contains a sufficient amount of crystallites oriented throughout the polymer in such a manner as to exert an effective barrier effect to water vapor.

The multimodal polyethylene composition of the invention has advantageous water vapor barrier properties. Generally, the polyethylene composition of the invention allows to prepare films having a water vapor transmission rate (WVTR) lower than 4 g/m$^2$ d.

In the present description and in the following claims, the WVTR has been measured at a temperature of 38° C. and at a relative humidity (RH) of 90% according to standard DIN 53122, T.2, on 30 µm films.

Thanks to the fact that the polyethylene composition of the invention includes at least three ethylene polymer fractions having distinct comonomer contents or molecular weights, and more particularly thanks to the fact that the polyethylene composition is at least trimodal and has a predetermined molecular weight distribution, the composition of the invention, on the one side, may have a broad molecular distribution, which advantageously permits to improve the processability of the composition, which in turn advantageously allows to use very low working temperatures, for example in the range of 180° C.-250° C.

On the other side, thanks to the fact that the polyethylene composition has a predetermined comonomer distribution, and in particular thanks to the absence of comonomer or, at the most, thanks to a very limited content of comonomer in the above-mentioned at least one first ethylene fraction and in the above-mentioned at least one third ethylene fraction of the composition, content which, as said above, is not higher than 0.3 mol %, preferably lower than 0.2 mol %, more preferably lower than 0.1 mol % and, still more preferably, lower than 0.05 mol %, and thanks to the presence of a higher comonomer content, namely higher than 0.3 mol %, in the second ethylene fraction of the composition, the mechanical properties of the composition, and in particular the dart drop impact and the tear propagation resistance, as well as the puncture resistance and the tensile and tear strength of the film products prepared therefrom, are advantageously improved.

The multimodal polyethylene composition of the invention includes at least three ethylene polymer fractions, preferably three ethylene polymer fractions, having distinct comonomer contents as specified in claim 1 and in any case, even when the comonomer content of the first fraction and of the third fraction is substantially the same, distinct molecular weights.

According to a preferred embodiment of the invention, the second molecular weight of the at least one second ethylene polymer fraction is preferably higher than the third molecular weight of the at least one third ethylene polymer fraction.

The comonomer incorporated in the composition is substantially incorporated in the second ethylene polymer fraction, which has a molecular weight higher than the above-mentioned first molecular weight and, preferably, higher than the above-mentioned third molecular weight.

In this way, the improvement of the mechanical properties of the composition is further enhanced.

According to an alternative embodiment of the invention, the second molecular weight of the at least one second ethylene polymer fraction is preferably lower than the third molecular weight of the at least one third ethylene polymer fraction.

In other words, the above-mentioned at least three ethylene polymer fractions are a series of subsequent distinct ethylene polymer fractions preferably having—starting from the lowest molecular weight fraction, which has no or the lowest comonomer content—increasing molecular weights, the comonomer being preferably substantially concentrated in the intermediate molecular weight fraction or, alternatively, in the highest molecular weight fraction.

According to a preferred embodiment, the multimodal polyethylene composition comprises more than three ethylene polymer fractions, for example four ethylene polymer fractions.

Comonomer distribution in which the comonomer is substantially incorporated only in the relatively higher molecular weight ethylene polymer fractions are substantially "inverse" with respect to a comonomer distribution where the relatively lower molecular weight fractions have the relatively higher comonomer contents and vice versa as obtainable, for example, by the use of conventional non-single site catalysts for each ethylene polymer fraction such as the Ziegler-Natta catalysts, while multimodal ethylene polymers having all ethylene polymer fractions produced using single-site catalysts, for example metallocene catalysts, have a substantially uniform comonomer distribution.

Preferably, the preferred comonomer distribution is such that a relatively higher amount of comonomer is incorporated in the relatively higher molecular weight fractions. That is, the ethylene polymer fractions having a $M_w$ greater than or equal to the average $M_w$ of the copolymer have a higher weight average amount of comonomer than the polymer fractions having a $M_w$ less than the average $M_w$.

Preferably, the multimodal polyethylene composition has a weight average molar mass $M_w$ of from 50 000 g/mol to 650 000 g/mol, preferably of from 50 000 g/mol to 600 000 g/mol, preferably of from 50 000 g/mol to 500 000 g/mol, more preferably from 100 000 g/mol to 350 000 g/mol and, still more preferably, from 140 000 g/mol to 350 000 g/mol.

Preferably, the multimodal polyethylene composition has a z-average molecular weight $M_z$ of less than 1 Mio. g/mol, more preferably in the range of from 250 000 g/mol to 700 000 g/mol and, still more preferably, from 300 000 g/mol to 500 000 g/mol. The definition of z-average molar mass $M_z$ is herewith in accordance with the definition given in *High Polymers* Vol. 20, Raff und Doak, Interscience Publishers, John Wiley & Sons, 1965, S. 443.

According to a particularly preferred embodiment of the present invention, the multimodal polyethylene composition has a polydispersity $M_w/M_n$ of from 7 to 50, preferably between 8 and 30 and, more preferably between 10 and 25 and, still more preferably, from 12 and 18.

According to a particularly preferred embodiment of the present invention, the multimodal polyethylene composition has a weight average molar mass $M_w$ of from 50 000 g/mol to 500 000 g/mol, more preferably from 100 000 g/mol to 300 000 g/mol and, still more preferably, from 120 000 g/mol to 250 000 g/mol.

According to a particularly preferred embodiment of the present invention, the multimodal polyethylene composition has a z-average molecular weight $M_w$ of less than 1 Mio. g/mol, preferably less than 800 000 g/mol, more preferably less than 700 000 g/mol and, still more preferably, between 500 000 and 700 000 g/mol.

More preferably, the multimodal polyethylene composition has a polydispersity $M_w/M_n$ a weight average molar mass $M_w$ and a z-average molecular weight $M_z$ respectively ranging in the above-mentioned preferred ranges: such a preferred combination of features advantageously permits to provide a polyethylene composition with improved and balanced processability and mechanical properties.

The molar mass distribution of the composition can be determined by using fractionation techniques, such as for example gel permeation chromatography-differential viscometry and temperature rising elution fractionation-differential viscometry. In the present application, the technique based on gel permeation chromatography-differential has been used.

Preferably, the above-mentioned first ethylene polymer fraction is an ethylene homopolymer having a comonomer content not higher than 0.3 mol %, preferably lower than 0.2 mol %, more preferably lower than 0.1 mol % and, still more preferably, lower than 0.05 mol %.

The copolymer of the above-mentioned at least second ethylene polymer fraction includes more than 0.3 mol %, preferably from above 0.3% to 10 mol %, more preferably from above 0.3% to 10 mol %, still more preferably from above 0.3 mol % to 6 mol %, still more preferably from 0.3 mol % to 3 mol %, still more preferably from 0.3 mol % to 2 mol %, still more preferably from 0.3 mol % to 1 mol %, and a molecular weight higher than the molecular weight of the homopolymer having the lowest molecular, weight, the comonomer being preferably selected from the group defined below.

Preferably, the above-mentioned third ethylene polymer fraction is an ethylene homopolymer having a comonomer content not higher than 0.3 mol %, preferably lower than 0.2 mol %, more preferably lower than 0.1 mol % and, still more preferably, lower than 0.05 mol %.

Preferably, the composition comprises a total comonomer content from 0.3 mol % to 11 mol %, preferably, from above 0.3 mol % to 6 mol %, still more preferably from 0.3 mol % to 3 mol %, still more preferably from 0.3 mol % to 2 mol %, still more preferably from 0.3 mol % to 1 mol %.

According to a preferred embodiment, each one of the fractions containing a comonomer in a mol % higher than 0.3 preferably comprises at least one comonomer, more preferably selected among 1-olefins.

Alternatively, the fractions containing a comonomer preferably comprise different comonomer types, more preferably selected among 1-olefins.

The comonomer incorporated in the ethylene copolymer fractions preferably includes at least one 1-olefin having formula $R^1CH=CH_2$, wherein $R^1$ is hydrogen or an alkyl radical with 1 to 12 carbon atoms and, more preferably, wherein $R^1$ is an alkyl radical with 1 to 10 carbon atoms.

In the above-mentioned ethylene copolymer fractions, in addition to ethylene it is possible to use any 1-olefin having from 3 to 12, preferably to 3 to 10, carbon atoms, e.g. propene, 1-butene, 1-pentene, 1-hexene, 4-methyl-1-pentene, 1-heptene, 1-octene, 1-decene and combinations thereof. More particularly, the ethylene copolymer preferably comprises 1-olefins having from 4 to 8 carbon atoms, e.g. 1-butene, 1-pentene, 1-hexene, 4-methylpentene or I-octene, in copolymerized form as comonomer unit. Particular preference is given to 1-olefins selected from the group consisting of 1-butene, 1-hexene and 1-octene.

The above-mentioned comonomers can be present either individually or in a mixture with one another.

The composition of the invention may have three or more polymer fractions. If, as better illustrated in the following with respect to a preferred embodiment, the composition comprises three ethylene polymer fractions having distinct molecular weights, the composition is said to be trimodal. In the preferred trimodal compositions of the invention, the different ethylene copolymer fractions preferably have also distinct comonomer contents.

When the composition is trimodal, the weight average molar mass $M_w$ of the first ethylene polymer fraction is preferably comprised between 1 000 and 100 000 g/mol, more preferably 10 000 and 100 000 g/mol, still more preferably between 20 000 and 80 000 g/mol and, in particular, between 30 000 and 70 000 g/mol, while the weight average molar mass $M_w$ of the second ethylene polymer fraction is preferably comprised between 10 000 and 1 000 000 g/mol, more preferably between 100 000 and 800 000 g/mol, still more preferably between 200 000 and 500 000 g/mol and, in particular, between 300 000 and 400 000 g/mol, and the weight average molar mass $M_w$ of the third ethylene polymer fraction is preferably comprised between 10 000 and 1 000 000 g/mol, more preferably between 100 000 and 800 000 g/mol, still more preferably between 200 000 and 500 000 g/mol and, in particular, between 300 000 and 400 000 g/mol.

Preferably, the molecular weight of the second ethylene polymer fraction and the molecular weight of the third ethylene polymer fraction range within these preferred ranges of values, the molecular weight of the second ethylene polymer fraction being preferably higher than the molecular weight of the third ethylene polymer fraction.

Alternatively, the molecular weight of the second ethylene polymer fraction is preferably lower than the molecular weight of the third ethylene polymer fraction. In this alternative case, the weight average molar mass $M_w$ of the third ethylene polymer fraction is preferably comprised between 10 000 and 1 000 000 g/mol, more preferably between 100 000 and 800 000 g/mol, still more preferably between 300 000 and 600 000 g/mol, in particular between 380 000 and 460 000 g/mol.

The trimodal composition preferably comprises from 5 to 65% by weight of said first ethylene polymer fraction, from 15 to 50% by weight of said second ethylene polymer fraction and from 5 to 65% by weight of said third ethylene polymer fraction. More preferably, the trimodal polyethylene composition comprises from 20 to 40% by weight of said first ethylene polymer fraction, from 20 to 40% by weight of said second polymer ethylene fraction, and from 20 to 40% by weight of said third polymer ethylene fraction. Still more preferably, the trimodal polyethylene composition comprises from 30 to 40% by weight of said first ethylene polymer fraction, from 30 to 40% by weight of said second ethylene fraction and from 30 to 40% by weight of said third ethylene polymer fraction. Each one of said % by weight of the first, second and third ethylene polymer fraction is based on the total weight of the composition.

Within such preferred composition ranges, it is advantageously possible to prepare compositions, in particular film compositions, having further improved mechanical properties, while being at the same time easily processable.

Preferably, in case of a trimodal composition, this comprises a first ethylene polymer fraction having a first density in the range 0.950-0.986 g/cm$^3$, preferably in the range 0.950-0.975 g/cm$^3$, more preferably in the range 0.952-0.973 g/cm$^3$ and, still more preferably, in the range 0.956-0.971 g/cm$^3$, a second ethylene polymer fraction having a second density in the range 0.880-0.960 g/cm$^3$, preferably 0.918-0.949 g/cm$^3$, more preferably in the range 0.920-0.948 g/cm$^3$ and, still more preferably, in the range 0.921-0.945 g/cm$^3$, and a third ethylene polymer fraction having a third density in the range 0.940-0.975 g/cm$^3$, preferably in the range 0.945-0.975 g/cm$^3$, more preferably in the range 0.950-0.970 g/cm$^3$ and, still more preferably, in the range 0.955-0.965 g/cm$^3$.

According to a preferred embodiment, independently from the number of ethylene polymer fractions of the composition, the density of the multimodal composition is of 0.910 g/cm$^3$ to 0.960 g/cm$^3$. Preferably, the density of the composition of the invention ranges in the high density range, i.e. from 0.920 g/cm$^3$ to 0.960 g/cm$^3$, more preferably from 0.930 to 0.960 g/cm$^3$, more preferably from 0.940 to 0.960 g/cm$^3$ and, still more preferably, from 0.944 to 0.954 g/cm$^3$.

The polydispersity $M_w/M_n$ of the first ethylene polymer fraction is preferably comprised between 2 and 10, more preferably between 4 and 9 and, still more preferably, between 6 and 8, the polydispersity $M_w/M_n$ of the second ethylene polymer fraction is preferably comprised between 1.5 and 5, more preferably between 2 and 4.5 and, still more preferably, between 2.5 and 3.5, while the polydispersity $M_w/M_n$ of the third ethylene polymer fraction is preferably greater than 8, preferably from above 8 to 30, more preferably from 10 to 25 and, still more preferably, between 12 and 20.

The polydispersity $M_w/M_n$ of the composition is preferably comprised between 7 and 50, more preferably between 8 and 30 and, more preferably between 9 and 25 and, still more preferably, from 11 and 18.

The multimodal polyethylene composition has preferably a Eta(vis)/Eta(GPC) lower than 1.1, Eta(vis) being the intrinsic viscosity as determined according to ISO 1628-1 and -3 and Eta(GPC) being the viscosity as determined by Gel Permeation Chromatography (GPC) in the standard determination of the molecular weight distribution according to standard DIN 55672 with 1,2,4-trichlorobenzene at 140° C.

Preferably, said composition has a melt flow rate MFR (190/21.6) comprised between 1 and 100 g/10 min, preferably between 5 and 100 g/10 min, more preferably between 8 and 60 g/10 min, still more preferably between 7 and 15 g/10 min, according to an alternative preferred embodiment between 20 and 30 g/10 min, and according to a further alternative preferred embodiment between 30 and 50 g/10 min, preferably between 32 and 48 kg/10 min, more preferably between 33 and 45 kg/10 min and, still more preferably, between 34 and 40 kg/10 min.

In the present description and in the following claims, the melt flow rate MFR(190/21.6) is the melt flow rate, known also as "high load melt flow rate", as determined according to standard ISO 1133, condition G, corresponding to a measurement performed at a temperature of 190° C. and under a weight of 21.6 kg.

Preferably, each of the first and of the third ethylene polymer fraction comprises at least 0.8 vinyl groups/1000 carbon atoms, more preferably from 0.8 to 5 vinyl groups/1000 carbon atoms. Still more preferably, the first ethylene polymer fraction comprises from 2 to 5 vinyl groups/1000 carbon atoms, while the third ethylene polymer fraction comprises from 0.5 to 1.5 vinyl groups/1000 carbon atoms.

Preferably, the polyethylene composition comprises at least 0.3 vinyl groups/1000 carbon atoms, more preferably at least 0.4 vinyl groups/1000 carbon atoms, still more preferably from 0.4 to 2 vinyl groups/1000 carbon atoms.

The content of vinyl groups/1000 carbon atoms is determined by means of IR, ASTM D 6248-98.

Preferably, the above-mentioned catalyst of the single site type used to prepare the at least one second ethylene polymer fraction of the multimodal polyethylene is a metallocene.

More preferably, in the multimodal polyethylene composition of the invention, the ethylene polymer fractions made of homopolymer are preferably prepared by means of non-single site catalysts, preferably of the non-metallocene type, while the polymer fractions made of copolymers are preferably prepared by means of a respective single site catalyst, preferably of the metallocene type.

According to a preferred embodiment of the invention, a mixed type catalyst system may be used to prepare the composition of the invention, i.e. a catalyst system comprising particles each containing at least three different kind of active species, in which at least one active species, namely that intended to prepare the at least second ethylene polymer fraction, is a single site catalyst, and the at least two further active species, namely those intended to prepare the at least first ethylene polymer fraction and the at least third ethylene polymer fraction, are preferably catalysts of the non-single site type.

Thanks to the fact that in the case of a mixed type catalyst system containing at least three active species at least three different polymerization catalysts are provided within the same catalyst system, it is advantageously possible to prepare the polyethylene composition of the invention by means of a single step polymerization process in a single reactor.

When the mixed type catalyst system contains three active species, for example, a trimodal polyethylene composition may be advantageously obtained, which permits, on the one side, to prepare a broad molecular weight distribution composition and, on the other side, to polymerize three ethylene polymer fractions having distinct molecular weights in a parallel way, i.e. substantially in a simultaneous manner, in one single reactor.

According to a further aspect of the invention, a mixed catalyst system having the features of appended claim 9 is provided.

The mixed catalyst system, which is particularly suitable to prepare the polyethylene composition of claim 1, preferably comprises at least one first and at least one third catalyst, each preferably comprising early transition metal catalysts for olefin polymers by coordination polymerization, more preferably catalysts based on groups 4-6 of the Periodic Table of Elements, still more preferably selected from the group consisting of Ti, V, Cr, Zr, Hf, and at least one second catalyst preferably comprising late transition metal catalysts for olefin polymers by coordination polymerization, more preferably based on groups 8-10 of the Periodic Table of Elements, still more preferably selected from the group consisting of Fe, Ni, Pd, Co.

Each of said at least one first catalyst and of said at least one third catalyst are preferably based on an iron component, preferably having a tridentate ligand bearing at least two ortho, ortho disubstituted aryl radicals, while said at least one second catalyst is preferably based on a monocyclopentadienyl complex of a metal of groups 4-6 of the Periodic Table of Elements, whose cyclopentadienyl system is preferably substituted by an uncharged donor or a hafnocene.

For the purposes of the present invention, an uncharged donor is an uncharged functional group containing an element of group 15 or 16 of the Periodic Table. Examples of cyclopentadienyl complexes are described in patent application WO2005/103100.

By way of illustrative example, the mixed catalyst system may contain at least one metallocene as catalyst of the single site type (e.g. hafnocene or zirconocene) and at least two transition metal compounds of the non-metallocene type, preferably iron components, each of the iron components preferably having a tridentate ligand bearing at least two aryl radicals, each bearing a halogen and/or alkyl substituent, as catalysts of the non-single site type. In particular, the mixed catalyst system may contain one metallocene (e.g. one hafnocene or one zirconocene) component and two transition metal compound of the non-metallocene type, preferably iron components.

Preferred catalysts of the single site type may be polymerization catalysts based on a monocyclopentadienyl complex of a metal of groups 4-6 of the Periodic Table of Elements, preferably hafnocene catalyst components such as, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

Particularly suitable hafnocenes are hafnium complexes of the following general formula:

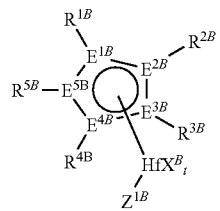

(I)

where the substituents and indices have the following meanings:

$X^B$ is fluorine, chlorine, bromine, iodine, hydrogen, $C_1$-$C_{10}$-alkyl, $C_2$-$C_{10}$-alkenyl, $C_6$-$C_{15}$-aryl, alkylaryl having from 1 to 10 carbon atoms in the alkyl part and from 6 to 20 carbon atoms in the aryl part, —$OR^{6B}$ or —$NR^{6B}R^{7B}$, or two radicals $X^B$ form a substituted or unsubstituted diene ligand, in particular a 1,3-diene ligand, and the radicals $X^B$ are identical or different and may be joined to one another, $E^{1B}$-$E^{5B}$ are each carbon or not more than one $E^{1B}$ to $E^{5B}$ is phosphorus or nitrogen, preferably carbon, t is 1, 2 or 3 and is, depending on the valence of Hf, such that the metallocene complex of the general formula (I) is uncharged, where $R^{6B}$ and $R^{7B}$ are each $C_1$-$C_{10}$-alkyl, $C_6$-$C_{15}$-aryl, alkylaryl, arylalkyl, fluoroalkyl or fluoroaryl each having from 1 to 10 carbon atoms in the alkyl part and from 6 to 20 carbon atoms in the aryl part and $R^{1B}$ to $R^{5B}$ are each, independently of one another hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{8B}{}_2$, $N(SiR^{8B}{}_3)_2$, $OR^{8B}$, $OSiR^{8B}{}_3$, $SiR^{8B}{}_3$, where the organic radicals $R^{1B}$-$R^{5B}$ may also be substituted by halogens and/or two radicals $R^{1B}$-$R^{5B}$, in particular vicinal radicals, may also be joined to form a five-, six- or seven-membered ring, and/or two vicinal radicals $R^{1D}$-$R^{5D}$ may be joined to form a five-, six- or seven-membered heterocycle containing at least one atom from the group consisting of N, P, O and S, where the radicals $R^{8B}$ can be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^{1B}$ is $X^B$ or

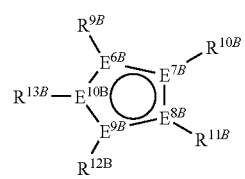

(II)

where the radicals $R^{9B}$ to $R^{13B}$ are each, independently of one another, hydrogen, $C_1$-$C_{22}$-alkyl 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $NR^{14B}{}_2$, $N(SiR^{14B}{}_3)_2$, $OR^{14B}$, $OSiR^{14B}{}_3$, $SiR^{14B}{}_3$, where the organic radicals $R^{9B}$-$R^{13B}$ may also be substituted by halogens and/or two radicals $R^{9B}$-$R^{13B}$, in particular vicinal radicals, may also be joined to form a five-, six- or seven-membered ring, and/or two vicinal radicals $R^{9B}$-$R^{13B}$ may be joined to form a five-, six- or seven-membered heterocycle containing at least one atom from the group consisting of N, P, O and S, where the radicals $R^{14B}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, $E^{6B}$-$E^{10B}$ are each carbon or not more than one $E^{6B}$ to $E^{10B}$ is phosphorus or nitrogen, preferably carbon, or where the radicals $R^{4B}$ and $Z^{1B}$ together form an —$R^{15B}{}_v$-$A^{1B}$- group, where $R^{15B}$ is

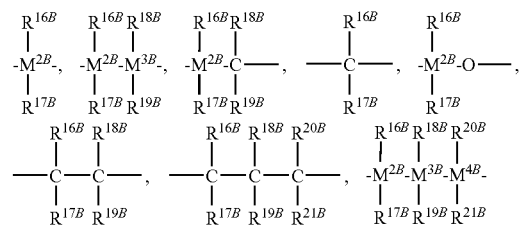

=$BR^{16B}$, =$BNR^{16B}R^{17B}$, =$AlR^{16B}$, —Ge—, —Sn—, —O—, —S—, =SO, =$SO_2$, =$NR^{16B}$, =CO, =$PR^{16B}$ or =$P(O)R^{16B}$, where $R^{16B}$-$R^{21B}$ are identical or different and are each a hydrogen atom, a halogen atom, a trimethylsilyl group, a $C_1$-$C_{10}$- alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2B}$-$M^{4B}$ are each silicon, germanium or tin, or preferably silicon, $A^{1B}$ is —O—, —S—,

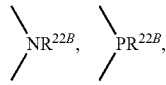

=O, =S, =$NR^{22B}$, —O—$R^{22B}$, —$NR^{22B}_2$, —$PR^{22B}_2$ or an unsubstituted, substituted or fused, heterocyclic ring system, where the radicals $R^{22B}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or Si($R^{23B}$)$_3$, $R^{23B}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl, v is 1 or when $A^{1B}$ is an unsubstituted, substituted or fused, heterocyclic ring system may also be 0 or where the radicals $R^{4B}$ and $R^{12B}$ together form an —$R^{15B}$— group.

$A^{1B}$ can, for example together with the bridge $R^{15B}$, form an amine, ether, thioether or phosphine. However, $A^{1B}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-4-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3$^{rd}$ revised edition, Verlag Chemie, Weinheim 1957.

The radicals $X^B$ in the general formula (II) are preferably identical, preferably fluorine, chlorine, bromine, $C_1$-$C_7$-alkyl or aralkyl, in particular chlorine, methyl or benzyl.

The synthesis of such complexes can be carried out by methods known per se, with the reaction of the appropriately substituted cyclic hydrocarbon anions with halides of hafnium being preferred. Examples of appropriate preparative methods are described, for example, in Journal of Organometallic Chemistry, 369 (1989), 359-370.

The hafnocenes can be used in the Rac or pseudo-Rac form. The term pseudo-Rac refers to complexes in which the two cyclopentadienyl ligands are in the Rac arrangement relative to one another when all other substituents of the complex are disregarded.

Examples of suitable hafnocenes are, inter alia, methylenebis(cyclopentadienyl)hafnium dichloride, methylenebis(3-methylcyclopentadienyl) hafnium dichloride, methylenebis(3-n-butylcyclopentadienyl)hafnium dichloride, methylenebis(indenyl)hafnium dichloride, methylenebis(tetrahydroindenyl) hafnium dichloride, isopropylidenebis(cyclopentadienyl)hafnium dichloride, isopropylidenebis(3-trimethylsilylcyclopentadienyl)hafnium dichloride, isopropylidenebis(3-methylcyclopentadienyl)hafnium dichloride, isopropylidenebis(3-n-butylcyclopentadienyl) hafnium dichloride, isopropylidenebis(3-phenylcyclopentadienyl)hafnium dichloride, isopropylidenebis(indenyl) hafnium dichloride, isopropylidenebis(tetrahydroindenyl) hafnium dichloride, dimethylsilanediylbis(cyclopentadienyl)hafnium dichloride, dimethylsilanediylbis(indenyl)hafnium dichloride, dimethylsilanediylbis(tetrahydroindenyl)hafnium dichloride, ethylenebis(cyclopentadienyl)hafnium dichloride, ethylenebis(indenyl)hafnium dichloride, ethylenebis(tetrahydroindenyl) hafnium dichloride, tetramethylethylene-9-fluorenylcyclopentadienylhafnium dichloride, dimethylsilanediylbis(tetramethylcyclopentadienyl)hafnium dichloride, dimethylsilanediylbis(3-trimethylsilylcyclopentadienyl)hafnium dichloride, dimethylsilanediylbis(3-methylcyclopentadienyl)hafnium dichloride, dimethylsilanediylbis(3-n-butylcyclopentadienyl)hafnium dichloride, dimethylsilanediylbis(3-tert-butyl-5-methylcyclopentadienyl)hafnium dichloride, dimethylsilanediylbis(3-tert-butyl-5-ethylcyclopentadienyl)hafnium dichloride, dimethylsilanediylbis(2-methylindenyl)hafnium dichloride, dimethylsilanediylbis(2-isopropylindenyl)hafnium dichloride, dimethylsilanediylbis(2-tert-butylindenyl)hafnium dichloride, diethylsilanediylbis(2-methylindenyl)hafnium dibromide, dimethylsilanediylbis(3-methyl-5-methylcyclopentadienyl)hafnium dichloride, dimethylsilanediylbis(3-ethyl-5-isopropylcyclopentadienyl)hafnium dichloride, dimethylsilanediylbis(2-ethylindenyl)hafnium dichloride, dimethylsilanediylbis(2-methyl-4,5-benzindenyl)hafnium dichloride, dimethylsilanediylbis(2-ethyl-4,5-benzindenyl) hafnium dichloride, methylphenylsilanediylbis(2-methyl-4,5-benzindenyl)hafnium dichloride, methylphenylsilanediylbis(2-ethyl-4,5-benzindenyl)hafnium dichloride, diphenylsilanediylbis(2-methyl-4,5-benzindenyl)hafnium dichloride, diphenylsilanediylbis(2-ethyl-4,5-benzindenyl) hafnium dichloride, diphenylsilanediylbis(2-methylindenyl) hafnium dichloride, dimethylsilanediylbis(2-methyl-4-phenylindenyl)hafnium dichloride, dimethylsilanediylbis(2-ethyl-4-phenylindenyl)hafnium dichloride, dimethylsilanediylbis(2-methyl-4-(1-naphthyl)indenyl) hafnium dichloride, dimethylsilanediylbis(2-ethyl-4-(1-naphthyl)indenyl)hafnium dichloride, dimethylsilanediylbis (2-propyl-4-(1-naphthyl)indenyl)hafnium dichloride, dimethylsilanediylbis(2-i-butyl-4-(1-naphthyl)indenyl)

hafnium dichloride, dimethylsilanediylbis(2-propyl-4-(phenanthryl)indenyl)hafnium dichloride, dimethylsilanediylbis(2-methyl-4-isopropylindenyl)hafnium dichloride, dimethylsilanediylbis(2,7-dimethyl-4-isopropyl-indenyl)hafnium dichloride, dimethylsilanediylbis(2-methyl-4,6-diisopropylindenyl)hafnium dichloride, dimethylsilanediylbis(2-methyl-4-[p-trifluoromethylphenyl]indenyl) hafnium dichloride, dimethylsilanediylbis(2-methyl-4-[3',5'-dimethylphenyl]indenyl)hafnium dichloride, dimethylsilanediylbis(2-methyl-4-[4'-tert-butylphenyl]indenyl)hafnium dichloride, diethylsilanediyl-bis(2-methyl-4-[4'-tert-butylphenyl]indenyl)-hafnium dichloride, dimethylsilanediylbis(2-ethyl-4-[4'-tert-butylphenyl]indenyl) hafnium dichloride, dimethylsilanediylbis(2-propyl-4-[4'-tert-butyl phenyl]indenyl)hafnium dichloride, dimethylsilanediylbis(2-isopropyl-4-[4'-tert-butylphenyl]-indenyl)hafnium dichloride, dimethylsilanediylbis(2-n-butyl-4-[4'-tert-butylphenyl]indenyl)hafnium dichloride, dimethylsilanediylbis(2-hexyl-4-[4'-tert-butylphenyl]indenyl) hafnium dichloride, dimethylsilanediyl(2-isopropyl-4-phenylindenyl)(2-methyl-4-phenylindenyl)hafnium dichloride, dimethylsilanediyl(2-isopropyl-4-(1-naphthyl)indenyl)(2-methyl-4-(1-naphthyl)indenyl)hafnium dichloride, dimethylsilanediyl(2-isopropyl-4-[4'-tert-butylphenyl] indenyl)(2-methyl-[4'-tert-butylphenyl]indenyl)hafnium dichloride, dimethylsilanediyl(2-isopropyl-4-[4'-tert-butylphenyl]-indenyl)(2-ethyl-4-[4'-tert-butylphenyl]indenyl) hafnium dichloride, dimethylsilanediyl(2-isopropyl-4-[4'-tert-butylphenyl]indenyl)(2-methyl-4-[3',5'-bis-tert-butylphenyl]indenyl)hafnium dichloride, dimethylsilanediyl (2-isopropyl-4-[4'-tert-butylphenyl]indenyl)(2-methyl-4-[1-naphthyl]indenyl)hafnium dichloride and ethylene(2-isopropyl-4-[4'-tert-butylphenyl]indenyl)(2-methyl-4-[4'-tert-butylphenyl]indenyl)hafnium dichloride, and also the corresponding dimethylhafnium, monochloromono(alkylaryloxy)hafnium and di(alkylaryloxy)hafnium compounds. The complexes can be used in the rac form, the meso form or as mixtures of these.

Among the hafnocenes of the above-mentioned general formula, those of the following formula

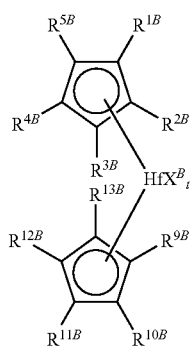

(III)

are preferred.

Among the compounds of formula (III), preference is given to those in which $X^B$ is fluorine, chlorine, bromine, $C_{1-4}$-alkyl or benzyl, or two radicals $X^B$ form a substituted or unsubstituted butadiene ligand, t is 1 or 2, preferably 2, $R^{1B}$ to $R^{5B}$ are each hydrogen, $C_1$-$C_8$-alkyl, $C_6$-$C_8$-aryl, $NR^{8B}_2$, $OSiR^{8B}_3$ or $Si(R^{8B})_3$ and $R^{9B}$ to $R^{13B}$ are each hydrogen, $C_1$-$C_8$-alkyl or $C_6$-$C_8$-aryl, $NR^{14B}_2$, $OSiR^{14B}_3$ or $Si(R^{14B})_3$ or in each case two radicals $R^{1B}$ to $R^{5B}$ and/or $R^{9B}$ to $R^{13B}$ together with the $C_5$ ring form an indenyl, fluorenyl or substituted indenyl or fluorenyl system.

The hafnocenes of the formula (III) in which the cyclopentadienyl radicals are identical are particularly useful.

Examples of particularly suitable compounds of the formula (III) are, inter alia:

bis(cyclopentadienyl)hafnium dichloride, bis(indenyl)hafnium dichloride, bis(fluorenyl)hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis(trimethoxysilylcyclopentadienyl)hafnium dichloride, bis(ethylcyclopentadienyl)hafnium dichloride, bis(isobutylcyclopentadienyl)hafnium dichloride, bis(3-butenylcyclopentadienyl)hafnium dichloride, bis(methylcyclopentadienyl)hafnium dichloride, bis(1,3-di-tert-butylcyclopentadienyl)hafnium dichloride, bis(trifluoromethylcyclopentadienyl)hafnium dichloride, bis(tert-butylcyclopentadienyl)hafnium dichloride, bis(n-butylcyclopentadienyl)hafnium dichloride, bis(phenylcyclopentadienyl)hafnium dichloride, bis(N,N-dimethylaminomethylcyclopentadienyl)hafnium dichloride, bis(1,3-dimethylcyclopentadienyl)hafnium dichloride, bis(1-n-butyl-3-methylcyclopentadienyl)hafnium dichloride, (cyclopentadienyl)(methylcyclopentadienyl)hafnium dichloride, (cyclopentadienyl)(n-butylcyclopentadienyl) hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis(tetramethylcyclopentadienyl)hafnium dichloride and also the corresponding dimethylhafnium compounds.

Further examples are the corresponding hafnocene compounds in which one or two of the chloride ligands have been replaced by bromide or iodide.

Further suitable metallocenes may be those based on the formulae (I) or (III), where, instead of hafnium, a different transition metal selected form the group consisting of early transition metal compounds is provided, such as for examples Ti, Zr, V, Cr.

Preferred iron components may be found in patent application WO 2005/103100. Preferred iron components are transition metal complexes with at least one ligand of the following general formula

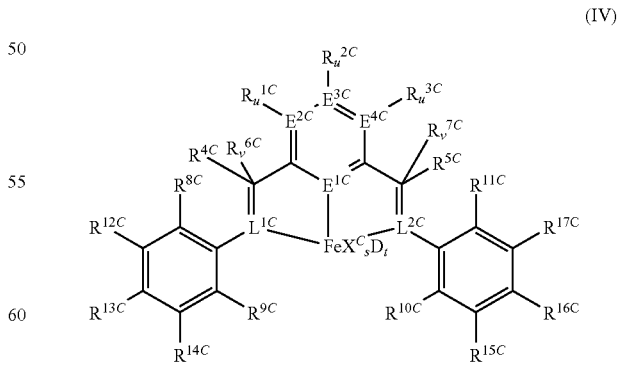

(IV)

where the variables have the following meanings:

$E^{1C}$ is nitrogen or phosphorus, in particular nitrogen, $E^{2C}$-$E^{4C}$ are each, independently of one another, carbon, nitrogen or phosphorus, in particular carbon, $R^{1C}$-$R^{3C}$ are each, independently of one another, hydrogen $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are joined to form a five-, six- or seven-membered heterocycle containing at least one atom from the group consisting of N, P, O and S, $R^{4C}$-$R^{7C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, $NR^{18C}_2$, $SiR^{19C}_3$, where the organic radicals $R^{4C}$-$R^{7C}$ may also be substituted by halogens and/or two geminal or vicinal radicals $R^{4C}$-$R^{7C}$ may also be joined to form a five-, six- or seven-membered ring, and/or two geminal or vicinal radicals $R^{4C}$-$R^{9C}$ are joined to form a five-, six- or seven-membered heterocycle containing at least one atom from the group consisting of N, P, O and S, and when v is 0, $R^{6C}$ is a bond to $L^{1C}$ and/or $R^{7C}$ is a bond to $L^{2C}$ so that $L^{1C}$ forms a double bond to the carbon atom bearing $R^{4C}$ and/or $L^{2C}$ forms a double bond to the carbon atom bearing $R^{5C}$, u is 0 when $E^{2C}$-$E^{4C}$ is nitrogen or phosphorus and is 1 when $E^{2C}$-$E^{4C}$ is carbon, $L^{1C}$-$L^{2C}$ are each, independently of one another, nitrogen or phosphorus, in particular nitrogen, $R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, $R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, the indices v are each, independently of one another, 0 or 1, the radicals $X^C$ are each, independently of one another, fluorine, chlorine, bromine, iodine, hydrogen, $C_1$-$C_{10}$-alkyl, $C_2$-$C_{10}$-alkenyl, $C_8$-$C_{20}$-aryl, alkylaryl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}_3$, where the organic radicals $R^{18C}$ may also be substituted by halogens or nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, D is an uncharged donor and t is from 0 to 4, in particular 0, 1 or 2.

The three atoms $E^{2C}$ to $E^{4C}$ in a molecule can be identical or different. If $E^{1C}$ is phosphorus, then $E^{2C}$ to $E^{4C}$ are preferably each carbon. If $E^{1C}$ is nitrogen, then $E^{2C}$ to $E^{4C}$ are each preferably nitrogen or carbon, in particular carbon.

The substituents $R^{1C}$-$R^{3C}$ and $R^{8C}$-$R^{17C}$ can be varied within a wide range. Possible carboorganic substituents $R^{1C}$-$R^{3C}$ and $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{1C}$ to $R^{3C}$ and/or two vicinal radicals $R^{8C}$-$R^{17C}$ may also be joined to form a 5-, 6- or 7-membered ring and/or two of the vicinal radicals $R^{1C}$-$R^{3C}$ and/or two of the vicinal radicals $R^{8C}$-$R^{17C}$ may be joined to form a five-, six- or seven-membered heterocycle containing at least one atom from the group consisting of N, P, O and S and/or the organic radicals $R^{1C}$-$R^{3C}$ and/or $R^{8C}$-$R^{17C}$ may also be substituted by halogens such as fluorine, chlorine or bromine. Furthermore, $R^{1C}$-$R^{3C}$ and $R^{8C}$-$R^{17C}$ can also be amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy or halogen such as fluorine, chlorine or bromine. Possible radicals $R^{19C}$ in organosilicon substituents $SiR^{19C}_3$ are the same carboorganic radicals as have been described above for $R^{1C}$-$R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals may also be bound to $E^{2C}$-$E^{4C}$ via an oxygen or nitrogen, for example trimethylsilyloxy, triethylsilyloxy, butyldimethylsilyloxy, tributylsilyloxy or tri-tert-butylsilyloxy.

Preferred radicals $R^{1C}$-$R^{3C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

Preferred radicals $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferred radicals $R^{8C}$-$R^{11C}$ are methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{8C}$ and $R^{10C}$ are each a $C_1$-$C_{22}$-alkyl which may also be substituted by halogens, in particular a $C_1$-$C_{22}$-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine and $R^{9C}$ and $R^{11C}$ are each a halogen such as fluorine, chlorine or bromine. Particular preference is given to $R^{8C}$ and $R^{10C}$ each being a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl and $R^{9C}$ and $R^{11C}$ are each a halogen such as fluorine, chlorine or bromine.

In particular, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^{8C}$ and $R^{10C}$ are identical. This is also preferred in the preferred embodiments described above.

The substituents $R^{4C}$-$R^{7C}$, too, can be varied within a wide range. Possible carboorganic substituents $R^{4C}$-$R^{7C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl, where the arylalkyl may be substituted by further alkyl groups, e.g. benzyl, o-, m-, p-methylbenzyl, 1- or 2-ethylphenyl, where two radicals $R^{4C}$ to $R^{7C}$ may also be joined to form a 5-, 6- or 7-membered ring and/or two geminal radicals $R^{4C}$-$R^{7C}$ may be joined to form a five-, six- or seven-membered heterocycle containing at least one atom from the group consisting of N, P, O and S and/or the organic radicals $R^{4C}$-$R^{7C}$ may also be substituted by halogens such as fluorine, chlorine or bromine. Furthermore, $R^{4C}$-$R^{7C}$ may be amino $NR^{18C}_2$ or $N(SiR^{19C}_3)_2$, for example dimethylamino, N-pyrrolidinyl or picolinyl. Possible radicals $R^{19C}$ in organosilicone substituents $SiR^{19C}_3$ are the same carboorganic radicals as have been described above for $R^{1C}$-$R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals can also be bound via nitrogen to the carbon bearing them. When v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$.

Preferred radicals $R^{4C}$-$R^{7C}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl and anthranyl. Preference is also given to amide substituents $NR^{18C}_2$, in particular secondary amides such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl) amide, didecylamide, N-methyloctadecylamide, N-methylcyclohexylamide, N-ethylcyclohexylamide, N-isopropylcyclohexylamide, N-tert-butylcyclohexylamide, dicyclohexylamide, pyrrolidine, piperidine, hexamethylenimine, decahydroquinoline, diphenylamine, N-methylanilide or N-ethylanilide.

$L^{1C}$ and $L^{2C}$ are each, independently of one another, nitrogen or phosphorus, in particular nitrogen, and when v is 0 can form a double bond with the carbon atom bearing $R^{4C}$ or $R^{5C}$. In particular, when v is 0, $L^{1C}$ and/or $L^{2C}$ together with the carbon atom bearing $R^{4C}$ or $R^{5C}$ form an imino group —$CR^{4C}$=N— or —$CR^{5C}$=N—. When v is 1, $L^{1C}$ and/or $L^{2C}$ together with the carbon atom bearing $R^{4C}$ or $R^{5C}$ forms, in particular, an amido group —$CR^{4C}R^{6C}$—$N^-$— or —$CR^{5C}R^{7C}$—$N^-$—.

The ligands $X^C$ result, for example, from the choice of the appropriate starting metal compounds used for the synthesis of the iron complexes, but can also be varied afterward. Possible ligands $X^C$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^C$. As further ligands $X^C$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_5)_4^-$. Amides, alkoxides, sulfonates, carboxylates and β-diketonates are also particularly useful ligands $X^C$. Some of these substituted ligands X are particularly preferably used since they are obtainable from cheap and readily available starting materials. Thus, a particularly preferred embodiment is that in which $X^C$ is dimethylamide, methoxide, ethoxide, isopropoxide, phenoxide, naphthoxide, triflate, p-toluenesulfonate, acetate or acetylacetonate.

Variation of the radicals $R^{18C}$ enables, for example, physical properties such as solubility to be finely adjusted. Possible carboorganic substituents $R^{18C}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N— or O— containing radicals, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{18C}$ may also be joined to form a 5- or 6-membered ring and the organic radicals $R^{18C}$ may also be substituted by halogens such as fluorine, chlorine or bromine. Possible radicals $R^{19C}$ in organosilicon substituents $SiR^{19C}_3$ are the same radicals which have been described above for $R^{18C}$, where two radicals $R^{19C}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{18C}$.

The number s of the ligands $X^C$ depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands D can be from 0 to 4 and is often dependent on the solvent in which the iron complex is prepared and the time for which the resulting complexes are dried and can therefore also be a nonintegral number such as 0.5 or 1.5. In particular, t is 0, 1 to 2.

The first catalyst, preferably of the non-single site type, more preferably of the non-metallocene type, and the third catalyst, preferably of the non-single site type, more preferably of the non-metallocene type, are preferably selected among the preferred groups of compounds indicated above so as to have a different responsiveness to the molar mass regulator, so as to obtain a first and, respectively, third ethylene polymer fraction having different molecular weights as defined in attached claim 1.

However, any other combination of active species which are able to polymerize ethylene in such a manner as to obtain at least three ethylene polymer fractions as defined in attached claim 1 is acceptable for the purpose of the invention.

The mixed catalyst system may for example comprise, as active species, at least one first component of the non-single site type, at least one second component of the single site type and at least one third component of the non-single site type, each component preferably being of the preferred embodiments described above, as well as at least one activating compound so as to advantageously improve the polymerization activity of the first, second and third catalyst component. The activation of the at least one three components of the catalyst may be effected using the same activating compound or different activating compounds.

In the preferred embodiment according to which the activating compound is the same, the molar ratio of the at least one first catalyst component to the activating compound, the molar ratio of the at least one second catalyst component to the activating compound, as well as the molar ratio of the at least one third catalyst component to the activating compound may range in a first, second and, respectively, third predetermined range which, with reference to illustrative example of the catalyst system comprising one metallocene component and two iron components, is preferably as follows. The molar ratio of the metallocene component to the activating compound may range from 1:1 to 1:10000, preferably from 1:1 to 1:2000, more preferably from 1:50 to 1:500, still more preferably from 1:70 to 1:200, for example from 1:70 to 1:150. The molar ratio of each of the iron components to the activating compound is also usually in the range from 1:0.1 to 1:10000, preferably from 1:1 to 1:2000, more preferably from 1:10 to 1:500, still more preferably from 1:20 to 1:300.

Suitable activating compounds which are able to react with one of the components of the mixed catalyst system, for example with the hafnocene component or the iron components, to convert the same into a catalytically active or more active compound are, for example, compounds such as an aluminoxane, a strong uncharged Lewis acid, an ionic compound having a Lewis-acid cation or an ionic compound containing a Brönsted acid as cation.

The catalyst system may further comprise at least one support. The preferred catalyst composition according to the invention comprises one support or a plurality of supports, which may be organic or inorganic. The at least one first catalyst component and/or the at least one second catalyst component and/or the at least one third catalyst component and the optional activating compound(s) of the catalyst, in particular, may be supported, for example on different supports or together on a common support.

Preferably a finely divided organic or inorganic solid support, such as for example silica, hydrotalcite, magnesium chloride, talc, montmorillonite, mica, or an inorganic oxide or a finely divided polymer powder (e.g. polyolefin or a polymer having polar functional groups) is used.

The catalyst system may further comprise a metal compound, preferably a metal of group 1, 2 or 13 of the Periodic Table of Elements and preferably different from the above-mentioned activating compound(s), which is used as constituent of the catalyst for the polymerization of olefins, for example for preparing a catalyst solid comprising the support and/or be added during or shortly before the polymerization.

It is also possible for the catalyst system firstly to be prepolymerized with a α-olefin, preferably with a linear $C_2$-$C_{10}$-1-alkene and in particular ethylene or propylene. The resulting prepolymerized catalyst solid may then be submitted to the actual polymerization step.

Furthermore, a small amount of an olefin, preferably an α-olefin, for example vinylcyclohexane, styrene or phenyldimethylvinylsilane can be added as additive during or after the preparation of the catalyst. Other additives, such as for example wax or oil, can be also added during or after the preparation of the catalyst.

According to a further aspect thereof, the present invention relates to a process for preparing a polyethylene multimodal composition, comprising the steps of:

a) providing at least one first catalyst, preferably of the non-single site type, more preferably of the non-metallocene type, at least one second catalyst of the single site type and at least one third catalyst preferably of the non-single site type, more preferably of the non-metallocene type;

b) providing at least one comonomer and optionally a molar mass regulator, preferably hydrogen;

c) subjecting ethylene, said at least one comonomer and optionally said molar mass regulator to at least one first polymerization stage in the presence of said at least one first catalyst so as to obtain a respective at least one first ethylene polymer fraction having a first molecular weight, a first comonomer content lower than 0.3 mol % and a first density comprised between 0.950 and 0.986 g/cm³;

d) subjecting ethylene, said at least one comonomer and optionally said molar mass regulator to at least one second polymerization stage in the presence of said at least one second catalyst so as to obtain a respective at least one second ethylene polymer fraction having a second molecular weight higher than said first molecular weight, a second comonomer content higher than 0.3 mol % and a second density comprised between 0.880 and 0.975 g/cm$^3$;

e) subjecting ethylene, said at least one comonomer and optionally said molar mass regulator to at least one third polymerization stage in the presence of said at least one third catalyst so as to obtain a respective at least one third ethylene polymer fraction having a third molecular weight higher than said first molecular weight, a third comonomer content higher than 0.3 mol % and a third density comprised between 0.940 and 0.975 g/cm$^3$, each one of said mol % of the first, second and third comonomer content being based on the total comonomer content of the composition.

Advantageously, the molecular weight distribution can be adjusted in a flexible manner depending on the end application of the composition, such as to prepare a broad range of products, in particular films, fibers, moldings, and pipes. Preferably, the molecular weight distribution can be advantageously adjusted by maintaining the molecular weight distributions of the first ethylene polymer fraction and of the third ethylene polymer fraction at respective predetermined distributions and by adjusting the molecular weight of the second ethylene polymer fraction.

Furthermore, it is advantageously possible to obtain a polyethylene composition which is particularly suitable for preparing films having improved barrier properties to water vapor while being, at the same time, easily processable.

Preferably, the above-mentioned steps c) to e) mentioned in attached claim 5 are carried out in such a manner that said composition has a melt flow rate MFR(190/21.6) comprised between 0.1 and 100, preferably between 1 and 20 or, alternatively, preferably between 20 and 50 g/10 min.

The above-mentioned steps are preferably carried out in such a manner that the composition has the preferred features according to any one of the preferred embodiments described above with reference to the composition of the invention.

So, for example, the process is preferably carried out in such a manner as to obtain a multimodal polyethylene composition having a density of from 0.940 g/cm$^3$ to 0.960 g/cm$^3$.

Ethylene with at least one comonomer, and optionally preferably with hydrogen as preferred molar mass regulator, is subjected, in the presence of said at least one single site catalyst and of said at least two non-single site catalysts, to at least three polymerization stages so as to conveniently obtain a trimodal polyethylene composition.

According to a preferred embodiment of the process of the invention, the ethylene may be copolymerized in the second polymerization stage with at least one 1-olefin, such as for example one or more of the 1-olefins described above with reference to the preferred embodiments of the composition of the invention. So, for example, the ethylene is preferably subjected to copolymerization in the second polymerization stage with at least one 1-olefin having formula R$^1$CH=CH$_2$, wherein R$^1$ is hydrogen or an alkyl radical with 1 to 12 carbon atoms and, more preferably, with 1 to 10 carbon atoms. As a second comonomer, any 1-olefin having from 3 to 12 carbon atoms, e.g. propene, 1-butene, 1-pentene, 1-hexene, 4-methyl-pentene, 1-heptene, 1-octene and 1-decene may be used. The second comonomer preferably comprises at least one 1-olefin having from 4 to 8 carbon atoms, e.g. 1-butene, 1-pentene, 1-hexene, 4-methylpentene or 1-octene, in copolymerized form as comonomer unit. Particular preference is given to 1-olefins selected from the group consisting of 1-butene, 1-hexene and 1-octene.

The above-mentioned comonomers can be used in the second polymerization stage either individually or in a mixture with one another.

Preferably, the temperature at which ethylene is (co)polymerized is carried out is of from 20 to 200° C. Preferably, the pressure at which ethylene is (co)polymerized is carried out is from 0.05 to 1 MPa.

According to a preferred embodiment of the process of the invention, the at least three ethylene polymer fractions may be distinguished with respect to each other on the basis of molecular weights by using at least three active catalytic species.

More preferably, such at least three active catalytic species, of which at least one is of the single site type and at least two are of the non-single site type, are incorporated in the same catalyst particle as described above with reference to the mixed catalyst system. In such a preferred embodiment, at least three corresponding polymerization stages are advantageously carried out in a substantially simultaneous manner in a parallel mode and the result of such at least three substantially simultaneous polymerization stages is a polyethylene composition which is at least trimodal. Thanks to these preferred features, it is advantageously possible to prepare the multimodal polyethylene component by means of a single step polymerization process in a single reactor, thus advantageously reducing both the plant costs and the energy consumption.

Alternatively, the above-mentioned at least three active catalytic species are incorporated in different catalyst particles. Also in this case, by providing a mixture of at least three particulate catalysts, a corresponding number of at least three polymerization stages is advantageously carried out in a substantially simultaneous manner in a parallel mode and the result of the different substantially simultaneous polymerization stages is a polyethylene composition which is at least trimodal.

In view of the above, the above-mentioned steps c) to e) are preferably carried out in a parallel manner in a single reactor. This is possible for example if the catalyst is a mixed type catalyst system. In this way, it is advantageously possible to prepare the multimodal polyethylene composition of the invention by means of a single step polymerization process in a single reactor.

The at least three ethylene polymer fractions may be distinguished with respect to each other on the basis of molecular weights preferably by polymerizing ethylene in a cascade process, i.e. by polymerizing ethylene in a respective number of at least three reactors arranged in series with each other. In this case, a corresponding number of at least three polymerization stages is advantageously carried out in a serial mode, and the result of the different subsequent polymerization stages is a polyethylene composition which is at least trimodal. Thanks to these preferred steps, it is advantageously possible to prepare the polyethylene composition of the invention by means of a multistage polymerization process in which the at least three polymerization stages are subsequent to each other.

Independently of the number and of the type of configuration of the reactors used, with each of these three alternative methods, good mixing of the polyethylene is advantageously achieved and the control of the molecular weight fractions of the various polymers and of the molecular weight distributions is conveniently simple.

A further possible alternative in order to distinguish the at least three ethylene polymer fractions with respect to each other on the basis of molecular weights is that of blending at least three ethylene polymer fractions each obtained by the use of a respective catalyst. In this case, by blending such at least three polymer fractions, it is advantageously possible to obtain an at lest trimodal polyethylene composition in a parallel mode, as a result of the blending of polymer fractions which have been separately prepared, either simultaneously or subsequently to each other, by the use of respective catalyst in respective polymerization stages.

The polymerization of ethylene in order to prepare the polyethylene composition of the invention can be carried out using all industrially known polymerization methods at temperatures in the range from 60° C. to 350° C., preferably from 0° C. to 200° C. and particularly preferably from 25° C. to 150° C., and under pressures of from 0.5 bar to 4000 bar, preferably from 1 bar to 100 bar, and particularly preferably from 3 bar to 40 bar. The polymerizations effected to prepare the polyethylene composition of the invention can be carried out in a known manner in solution, in suspension, in the gas phase or in a supercritical medium in the conventional reactors used for the polymerization of olefins. The polymerization can be carried out batchwise or, more preferably, continuously in one stage (for example, as described above, if a mixed catalyst is used) or in more stages. Solution processes, suspension processes, stirred gas-phase processes and gas-phase fluidized-bed processes are all possible. Gas-phase fluidized-bed processes are particularly preferred.

The mean residence times are preferably from 0.5 to 5 hours. The advantageous pressure and temperature ranges for carrying out the polymerizations usually depend on the polymerization method.

In the case of suspension polymerizations, for example, the polymerization is usually carried out In a suspension medium, preferably an inert hydrocarbon, more preferably an alcane such as for example hexane, or mixtures of hydrocarbons or else in the monomers themselves. The polymerization temperatures are generally in the range from 0° C. to 115° C., more preferably from 70° C. to 120° C., and the pressure is generally in the range from 1 bar to 100 bar. The polymerization can be carried out either batchwise or continuously, e.g. in stirring autoclaves, in tube reactors, such as for example in loop reactors. Particular preference is given to employing the Phillips PF process as described in U.S. Pat. Nos. 3,242,150 and 3,248,179. The gas-phase polymerization is generally carried out in the range from 30° C. to 125° C. at pressures of from 1 bar to 50 bar.

Among the above-mentioned polymerization processes used to prepare the polyethylene component of the invention, particular preference is given to gas-phase polymerization and, more in particular, gas-phase fluidized-bed reactors, solution polymerization and suspension polymerization, such as for example in loop reactors and stirred tank reactors. The gas-phase polymerization may also be carried out in the condensed or supercondensed mode, in which part of the circulating gas is cooled to below the dew point and is recirculated as a two-phase mixture to the reactor. Furthermore, it is possible to use a multizone reactor in which at least three reciprocally linked polymerization zones are provided, so that the polymer is passed alternately through these at least three zones a predetermined number of times. The at least three zones may also be subjected to different polymerization conditions. A multizone reactor having different polymerization zones is described, for example, in WO 97/04015. The different or identical polymerization stages, as already explained above, may also, if desired, be carried out in a serial manner, namely in a at least three reactors arranged in series to each other so as to form a polymerization cascade. A first reactor may be for example a gas-phase reactor serially arranged with a second reactor which, for example, may be a multizone reactor. A parallel reactor arrangement using at least three identical or different processes is also possible. Furthermore, molar mass regulators, such as for example hydrogen, or conventional additives, such as for example antistatics, may also be used in the polymerizations. If hydrogen is added and if the temperature is increased, a lower z-average molar mass is advantageously achieved.

The polymerization is preferably carried out in a single reactor, in particular in a gas-phase reactor. The polyethylene powder so obtained is advantageously more homogeneous with respect to the polyethylene obtained as a result of a cascade process, where a the at least three polymerization stages are carried out in a serial manner in at least three reactors arranged in series to each other, so that, unlike the powder obtainable by means of the cascade process, a possible subsequent extrusion is conveniently not necessary in order to obtain a homogeneous product.

The composition of the invention may also be prepared by blending at least one first ethylene fraction and at least one second ethylene fraction as defined above, preferable by intimate mixing of individual components, for example by melt extrusion in an extruder or kneader (as described, for example, in "Polymer Blends" in *Ullmann's Encyclopedia of Industrial Chemistry*, 6 Edition, 2000, Electronic Release).

The multimodal polyethylene composition of the invention can be extruded and blown into films, but also extruded into pipes and injection or blow molded into articles or used to manufacture fibers.

Accordingly, the present invention relates to the use of a multimodal polyethylene composition as defined above for producing a film, as well as to a film comprising the multimodal polyethylene composition as defined above.

Furthermore, the present invention relates to a particularly preferred film selected from the group of films for food uses, stretch films, hygienic films, films for office uses, sealing layers, automatic packaging films, composite and laminating films.

Films in which the multimodal polyethylene composition of the invention is present as a significant component contain from 50% by weight to 100% by weight, preferably from 60% by weight to 90% by weight, of the multimodal polyethylene composition of the invention, based on the total polymer material used for manufacture. In particular, films including a plurality of layers in which at least one of the layers contains from 50% by weight to 100% by weight of the multimodal polyethylene composition of the invention are also included.

In general the films are preferably produced by plastification of the multimodal polyethylene composition of the invention at a melt temperature in the range of from 190° C. to 230° C., by forcing the plasticized polyethylene through an annular die and cooling. The film may further comprise of from 0% by weight to 30% by weight, preferably from 0.1% by weight to 3% by weight of auxiliaries and/or additives known per se, e.g. processing stabilizers, stabilizers against the effects of light and heat, customary additives such as lubricants, antioxidants, antiblocking agents and antistatics, and also, if appropriate, dyes.

The multimodal polyethylene composition of the invention may be used to prepare films with a thickness of from 5 $\mu$m to 2.5 mm. The films can for example be prepared via blown film extrusion with a thickness of from 5 $\mu$m to 250 $\mu$m or via flat film extrusion, such as cast film extrusion with a thickness of from 10 $\mu$m to 2.5 mm. During blown film extrusion the polyethylene melt is forced through an annular die. The bubble which is formed is inflated with air and hauled off at a higher speed than the die outlet speed. The bubble is intensively cooled by a current of air so that the temperature at the frost line is lower than the crystallite melting point. The bubble is then collapsed, trimmed if necessary and rolled up using a suitable winding instrument. The polyethylene composition of the invention may be extruded either according to a "long stalk" configuration or according to a "conventional" configuration depending on the density of the polyethylene. In the "long stalk" configuration, which is normally suitable for blowing high density polyethylene, the bubble of polymer blown into a film has a well defined and longer neck height with respect to the "conventional" configuration, which is suitable in blowing low density polyethylene.

The films may be obtained for example in chill roll lines or thermoforming film lines. Furthermore composite films essentially based on the polyethylene composition of the invention may be produced on coating and laminating lines. Especially preferred are composite films wherein paper, aluminum or fabric substrates are incorporated into the composite structure. The films may have a single layer or a plurality of layers, each obtained by coextrusion.

The multimodal polyethylene composition of the invention is suitable for producing films in blown film and cast film plants at high outputs. The films display improved water barrier properties while maintaining good mechanical properties, in particular, as better described in the following, in terms of dart drop impact and of tear propagation resistance without impairing the optical properties. The multimodal polyethylene composition of the invention is suitable, in particular, for preparing packaging films, such as for example heat sealing films, and in particular for films intended to be used in the food industry.

The films of the invention are especially suitable in applications requiring high water barrier properties, such as for example liners for cereals and crackers, cakes and similar food products, since the films of the invention also have a very low odor and taste level.

The films of the invention having a thickness in the order of 30 µm have advantageously a haze, as determined by ASTM D 1003-00 on a BYK Gardener Haze Guard Plus Device on at least 5 pieces of film of size 10×10 cm, below 45%. The dart drop impact of films having a thickness in the order of 30 µm as determined by ASTM D 1709 Method A is advantageously above 40 g. The clarity of films having a thickness in the order of 30 µm as determined by ASTM D 1746-03 on a BYK Gardener Haze Guard Plus Device, calibrated with calibration cell 77.5, on at least 5 pieces of 10×10 cm films is advantageously at least 65%. The 20° gloss of films having a thickness in the order of 30 µm as determined by ASTM D 2457-03 on a 20° gloss meter with a vacuum plate for fixing the film, on at least 5 pieces of film, is advantageously of at least 18.

The scrap obtained during the production of these films can be conveniently recycled. If the films are produced by a first extruder, film trimmings may be compacted or ground and fed to a second extruder, where they are melted so as to be ready to be fed back to the main extruder and, in this way, conveniently recycled. The film trimmings should be reground to grains having a size which can be fed into the feed section of the first extruder together with the virgin polyethylene. The films containing such recycled material do not show any significant deterioration of the properties compared to films without recycled material.

The multimodal polyethylene composition of the invention may be also used to prepare articles by means of a number of techniques, such as for example blow molding, injection molding, roto-molding and compression molding.

As an illustrative example, the multimodal polyethylene composition of the invention may be used to prepare textile articles starting from semi-finished products such as filaments, monotapes or stretched tapes, which are preferably prepared from a film produced preferably produced by a blown film process. These semi-finished products are particularly suitable to manufacture, for example, artificial grass, nets, geotextiles, ropes, yarns, fabrics, tarpaulins and bags.

In particular, the multimodal polyethylene composition of the invention is suitable to prepare blow molded articles, in particular articles manufactured by injection molding.

DETAILED DESCRIPTION OF THE PREFERRED EMBODIMENTS

The present invention will be further described by means of the following preferred embodiments without restricting the scope of the invention.

If not otherwise indicated, all synthesis and polymerizations were carried out in an argon atmosphere. All suspending agents were washed by argon and dried through molecular sieves before being used.

EXAMPLE 1

Preparation of the Individual Components of the Catalyst a1) 2,6-diacetylpyridinbis(2,4,6-trimethylphenylanil) iron dichloride 163.2 g of 2,6-diacetylpyridin (1 mol), 337 g of 2,4,6-trimethylaniline (2.5 mol) and 18 g of formic acid in 3000 ml MeOH were stirred at 65° C. for 8 h. The reaction media was then cooled to 25° C. under stirring. After one night at 25° C. the solution became a suspension. This suspension was filtered and washed twice with 300 ml of MeOH. The yellow powder was dried under high vacuum. 333.5 g of 2,6-diacetylpyridinbis(2,4,6-trimethylphenylanil) were obtained with a yield of 83%. The reaction with iron (II)-chloride was performed according to Qian et al., *Organometallics* 2003, 22, 4312-4321.

a2) 2,6-diacetylpyridinbis(2,4-dichloro-6-methylphenylanil) iron dichloride 2,6-diacetylpyridinbis(2,4-dichlor-6-methylphenylanil) iron dichloride was prepared according to Qian et al., Organometallics 2003, 22, 4312-4321. 65.6 g of 2,6-diacetylpyridin (0.4 mol), 170 g of 2,4-dichloro-6-methylaniline (0.483 mol), 32 g of silica gel of type 135 and 160 g of molecular sieve (4Å) in 1500 ml toluene were stirred at 80° C. for 5 h. Additional 32 g of silica gel of type 135 and 160 g of molecular sieve (4Å) were added. The stirring was continued at 80° C. for further 8 h, the insoluble material was filtered and washed twice with toluene. The solvent was distillated from the filtrate obtained in this manner. Subsequently, the residue was charged with 200 ml methanol and mixed at 55° C. for 1 h. The suspension obtained in this manner was filtered and the obtained material was washed with methanol and liberated from the solvent. 95 g of 2,6-diacetylpyridinbis(2,4-dichloro-6-methylphenylanil) were obtained with a yield of 47%. The reaction with iron (II)-chloride was performed according to Qian et al., Organometallics 2003, 22, 4312-4321.

a3) 2,6-diacetylpyridinbis(2-dichloro-4,6-dimethylphenylanil) iron dichloride 2,6-Bis[1-(2-chloro-4,6-dimethylphenylimino)ethyl]pyridine was prepared as described in example 2 of WO 98/27124 and was used to synthesize 2,6-diacetylpyridinbis(2-dichloro-4,6-dimethylphenylanil) iron dichloride by using iron(II)chloride as described in example 8 of WO 98/27124.

b) bis(n-butylcyclopentadienyl)hafnium dichloride

Bis(n-butylcyclopentadienyl)hafnium dichloride [M=491.84 g/mol] was purchased from Crompton, Bergkamen.

EXAMPLE 2 a) Support Pretreatment

ES70X®, a spray-dried silica gel from Ineos Silicas, was calcinated at 600° C. for 6 h.

b) Preparation of the Catalyst

A mixture of 216.4 mg (0.44 mmol) of bis(n-butylcyclopentadienyl)hafnium dichloride as in Example 1-b) and 11.5 ml of methylalumoxane, MAO (4.75 M in toluene, 0.0529 mol), commercially available from Albemarle, was stirred at ambient temperature, i.e. at about 20° C., for 1 hour. Subsequently, while stirring, 8.8 g of the support pretreated as described in a) were added to the mixture so obtained within 15 min (ratio Hf:Al=1:120). After this addition, stirring continued for an additional hour. 12.6 g of free flowing catalyst was obtained.

EXAMPLE 3 a) Support Pretreatment

Sylopol 2107®, a spray-dried silica gel from Grace, was calcinated at 600° C. for 6 h.

b) Preparation of the Catalyst

A mixture of 0.144 g (0.24 mmol) of 2,6-diacetylpyridinbis(2,4-dichloro-6-methylphenylanil) iron dichloride prepared as in Example 1-a2) and 7.2 ml of MAO (4.75 M in toluene, 34.2 mmol) was stirred at ambient temperature for 1 hour. Subsequently, while stirring, the mixture so obtained was added to 7.9 g of the support pretreated as described in a) (ratio Fe:Al=1:144). After this addition, the stirring continued for 1 h. Subsequently, the catalyst was dried under vacuum at ambient temperature for 1 h. 9.7 g of free flowing catalyst were obtained.

EXAMPLE 4 a) Support Pretreatment

Sylopol 2107®, a spray-dried silica gel from Grace, was calcinated at 600° C. for 6 h.

b) Preparation of the Catalyst 1.9 l of MAO (4.75 M in toluene, 9.03 mol) was dosed at 0° C. to a suspension of 3 kg of the support pretreated as described in a) in 30 l toluene. Subsequently, the suspension so obtained was heated at 80° C. and stirred for 1 h. The suspension was filtered and washed once with 15 l toluene, and subsequently dried at 40° C. under vacuum for 8 h. 3190 g of catalyst precursor were obtained. Subsequently, a mixture of 1455 mg (2.73 mmol) of 2,6-diacetylpyridinbis(2,4,6-trimethylphenylanil) iron dichloride prepared as in Example 1-a1) and 58.9 ml of MAO (4.75 M in toluene, 279.8 mmol) was stirred at ambient temperature for 15 min so as to obtain a complex solution. Subsequently, 108.4 g of the catalyst precursor were suspended in 750 ml toluene and the complex solution was added thereto and stirred at ambient temperature for 2.5 h. After subsequent filtration, the suspension so obtained was washed in with 600 ml toluene twice and the catalyst so obtained was dried under vacuum. 165.1 g of free flowing catalyst were obtained.

EXAMPLE 5 a) Support Pretreatment

Sylopol 2107®, a spray-dried silica gel from Grace, was calcinated at 600° C. for 6 h.

b) Preparation of the Catalyst

A mixture of 0.353 g (0.66 mmol) of 2,6-diacetylpyridinbis(2-dichloro-4,6-dimethylphenylanil) iron dichloride prepared as in Example 1-a3) and 13.2 ml of MAO (4.75 M in toluene, 62.7 mmol) was stirred at ambient temperature for 1 h and, while stirring, added to 12.5 g of the support pretreated as described in a) at −10° C. (ratio Fe:Al=1:95). After this addition, the stirring continued for 1 h. 26.7 g of free flowing catalyst were obtained.

EXAMPLE 6

Invention a) Support Pretreatment

Sylopol 2107®, a spray-dried silica gel from Grace, was calcinated at 600° C. for 6 h.

b) Preparation of the Catalyst

A mixture of 195 mg (0.35 mmol) of 2,6-diacetylpyridinbis(2-dichloro-4,6-dimethylphenylanil) iron dichloride prepared according to Example 1-a3), of 280 mg (0.53 mmol) of 2,6-diacetylpyridinbis(2,4,6-trimethylphenylanil) iron dichloride prepared according to Example 1-a1) and 2.466 g (5.01 mmol) of bis(n-butylcyclopentadienyl)hafnium dichloride as in Example 1-b) and 124 ml MAO (4.75 M in toluene, commercially available from Albemarle, 589.4 mmol) were stirred at ambient temperature for 120 min and subsequently, while stirring, added at 0° C. to 85 g of the support pretreated as described in a) [ratio ($\Sigma$Fe+Hf):Al=1:100)]. 201 g of catalyst were obtained.

EXAMPLE 7

Invention a) Support Pretreatment

Sylopol 2107®, a spray-dried silica gel from Grace, was calcinated at 600° C. for 6 h.

b) Preparation of the Catalyst

A mixture of 303.4 mg (0.537 mmol) of 2,6-diacetylpyridinbis(2-dichloro-4,6-dimethylphenylanil) iron dichloride prepared as in Example 1-a3), of 211.9 mg (0.4026 mmol) of 2,6-diacetylpyridinbis(2,4,6-trimethylphenylanil) iron dichloride prepared as in Example 1-a1), of 3.96 g (8.05 mmol) of bis(n-butylcyclopentadienyl)hafnium dichloride as in Example 1-b) and of 189.3 ml MAO (4.75 M in toluene, commercially available from Crompton, 899.1 mmol) were stirred at ambient temperature for 30 min and subsequently, while stirring, added to 134.2 g of the support pretreated as described in a) and further stirred at ambient temperature for 1 h [ratio ($\Sigma$Fe+Hf):Al=1:100)]. The solid was dried under vacuum until a free flowing powder was attained. 276.5 g of catalyst, which still contained 32.4% w of solvent. The apparent density was of 486 g/l.

EXAMPLE 8

Invention a) Support Pretreatment

Sylopol 2107®, a spray-dried silica gel from Grace, was calcinated at 600° C. for 6 h.

b) Preparation of the Catalyst

A mixture of 509.04 g (0.84 mol) of 2,6-diacetylpyridinbis (2,4-dichloro-6-methylphenylanil) iron dichloride prepared according to Example 1-a2), 440.43 g (0.84 mol) of 2, diacetylpyridinbis(2,4,6-trimethylphenylanil) iron dichloride prepared according to Example 1-a1,4131 g (8.4 mol) of bis(n-butylcyclopentadienyl)hafnium dichloride as in Example 1-b) and 213 l MAO (4.75 M in toluene, 1011.75 mol, commercially available from Albemare) were stirred at 20° C. for 120 min and subsequently, while stirring, added to 140 kg of the support pretreated as described in a) at 0-5° C. and further stirred at ambient temperature for additional 30 min (ratio (ΣFe+Hf):Al=1:100). 330 kg of catalyst, which still contained 44% w of solvent were obtained. The apparent density was of about 490 g/l.

EXAMPLES 9-11

(Comparative): Polymerization with the Catalysts of Examples 2, 3 and, Respectively, 5

Examples 9-11 illustrate three polymerization runs, whose conditions are summarized in Table 1, namely one polymerization run for each one of the catalysts of respective Examples 2, 3, and 5. In each run, a 1 l autoclave, initially fed with 100 g of polyethylene and under inert atmosphere of argon, at the respective temperatures indicated in Table 1, was used. 3 ml of a triisopropylaluminium solution in heptane (corresponding to 150 mg of triisopropylaluminium) as well as 1 ml of Costelan AS100 (an antistatic agent commercially available at Costenoble GmbH & Co KG) and a respective solid catalyst were metered in the autoclave, the amount of catalyst used in each run being shown in Table 1. As comonomer, hexene was used. The amounts of comonomer in each of the three runs are given in Table 1. In each case, the polymerization was carried out at an ethylene pressure of 10 bar of for 60 min, the total pressure being of 20 bar. The polymerization was stopped by discharging the pressure. The product was discharged through the discharging valve.

EXAMPLE 12

(Comparative): Polymerization with the Catalyst of Example 4

In Example 12 a 1 l autoclave, initially fed with 100 g of polyethylene and under inert atmosphere of argon, at the temperature of 90° C., was used. 4.3 ml of a triisobutylaluminium solution in heptane (corresponding to 160 mg of triisobutylaluminium) and solid catalyst were metered in the autoclave, the amount of catalyst being shown in Table 1. The polymerization was carried out at an ethylene pressure of 10 bar for 60 min, the total pressure being of 19 bar. The polymerization was stopped by discharging the pressure. The product was discharged through the discharging valve. The polymerization conditions are summarized in Table 1.

EXAMPLE 13

(Invention): Polymerization with the Catalysts of Example 6

The polymerization was performed as in comparative Examples 9-11, with the exception that the catalyst was the catalyst described in Example 6 and under the conditions summarized in Table 1.

TABLE 1

| Ex. | catalyst [mg] | hexene [mg] | hexene [mol %] | Vinyl groups [1/1000 C] | T [° C.] | productivity [gPE/gcat * h] | I.V. [dl/g] | $M_w$ [kg/mol] | $M_w/M_n$ | density* [g/cm$^3$] |
|---|---|---|---|---|---|---|---|---|---|---|
| 9  | 121 | 3   | 1.8  | 0.01 | 80 | 306 | 4.02 | 372000 | 5.3  | 0.920 |
| 10 | 111 | 3   | <0.3 | 2.80 | 80 | 342 | 0.89 | 41300  | 6.5  | 0.971 |
| 11 | 156 | 0   | <0.3 | 1.96 | 70 | 351 | 1.08 | 67700  | 7.3  | 0.965 |
| 12 | 250 | 0   | <0.3 | 0.73 | 90 | 240 | 4.24 | 422000 | 21.7 | 0.954 |
| 13 | 93  | 0.2 | 0.40 | 0.50 | 70 | 161 | 3.79 | 348000 | 16.1 | 0.944 | where:

the content of vinyl groups/1 000 carbon atoms is determined by means of IR, ASTM D 6248-98;

the productivity is the productivity of the catalyst and is expressed in g of polymer obtained per mmol of transition metal compound (complex) per hour;

I.V. is the intrinsic viscosity, i.e. the limit value of the viscosity number obtained by extrapolation at concentration zero. It was measured at 135° C. by means of an automatic Ubbelohde viscosimeter (Lauda PVS 1) with decaline as suspending agent, in accordance with standard ISO 1628;

$M_w$ is the weight average molar mass; $M_n$ is the number average molar mass; $M_w/M_n$ is the polydispersity. The determination of the values $M_n$, $M_w$, and of the polydispersity $M_w/M_n$ derived therefrom was carried out by means of high-temperature gel permeation chromatography on a WATERS 150 C using a method based on DIN 55672 and the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 µl injection volume, temperature: 140° C. The columns were calibrated with polyethylene standards with molar masses of from 100 bis 10$^7$ g/mol. The evaluation was carried out by using the Win-GPC software of Fa. HS-Entwicklungsgesellschaft für wissenschaftliche Hard-und Software mbH, Ober-Hilbersheim;

density has been determined according to the standard DIN EN ISO 1183-1, variant A.

EXAMPLE 14

(Invention): Polymerization with the Catalyst of Example 7

In a continuous fluid bed reactor, at a pressure of 24 bar, and 4.5 kg/h output, 44.31 vol. % of ethylene, 0.43 vol. % of hexene and 1.98 vol. % hexane were polymerized with the catalyst of Example 7. Nitrogen (13.54 vol %) and propane (39.6 vol %) were used as inert gas. Furthermore, 0.1 g/h triisobutylaluminium and 6 ppm/h of Costelan AS100 (an antistatic agent commercially available from Costenoble GmbH & Co KG) as solution in hexane were metered. The polymerization conditions are indicated in Table 2.

EXAMPLE 15

(Invention): Polymerization with the Catalyst of Example 8

In a continuous fluid bed reactor, at a pressure of 24 bar, and 48 kg/h output, 51.7 vol. % of ethylene, 0.19 vol. % hexene and 5.1 vol % of hexane were polymerized with the catalyst of Example 8. Nitrogen (42.8 vol %) was used as inert gas. Furthermore, 0.4 g/h of trihexylaluminum, 11 ppm/h of Costelan AS100 (an antistatic agent commercially available from Costenoble GmbH & Co KG), as well as 8 ppm/h of Atmer 163 (an antistatic agent commercially available from Ciba Specialty Chemicals) as solution in hexane were metered. The polymerization conditions are indicated in Table 2.

TABLE 2

| Example | 14 | 15 |
| --- | --- | --- |
| Productivity [g PE/g cat] | 2696 | 1500 |
| Hydrogen [l/h] | 1.96 | 1.20 |
| total inert [vol %] | 55 | 48 |
| Temperature [° C.] | 94 | 100 |
| MFR ($^{190}/_{21.6}$) [g/10 min] | 33.6 | 34.9 |
| Bulk density [g/l] | 427 | 448 |
| I.V. [dl/g] | 1.9 | 2.1 |
| $M_w$ [g/mol] | 149000 | 149000 |
| $M_w/M_n$ [—] | 8.8 | 12.2 |
| Density [g/cm$^3$] | 0.946 | 0.950 |
| Hexene [mol %] | 0.52 | 0.55 |
| vinyl groups [$^1/_{1000}$ carbon atoms] | 0.59 | 1.25 | where:
the productivity is the ratio of the amount of polymer in g and the amount of catalyst system in g;
the content of vinyl groups/1000 carbon atoms, I.V., $M_w$ and $M_w/M_n$ are the same as described with reference to Table 1.

EXAMPLE 16

Invention a) Preparation of the Mixed Catalyst System

A mixture of 188 g (0.333 mmol) of 2,6-diacetylpyridinbis (2-dichloro-4,6-dimethylphenylanil) iron dichloride prepared according to the above-mentioned procedure under Example 1, a3), 341 mg (0.65 mmol) of 2,6-diacetylpyridinbis(2,4,6-trimethylphenylanil) iron dichloride prepared according to the above-mentioned procedure under Example 1, a1), 2.4 g (5 mmol) of bis(n-butylcyclopentadienyl) hafnium dichloride, commercially available from Crompton, and 112 ml MAO (4.75 M in toluene, 532 mmol, commercially available from Albemarle) were stirred at ambient temperature for 120 minutes and subsequently, namely within 15 minutes, added, while stirring, to a suspension of 81.1 g of Sylopol 2107® at 0° C. (calcinated at 600° C. for 6 hours according to the procedure under Example 3, a)) ((ΣFe+Hf): Al=1:100). Then the catalyst was stirred at ambient temperature for additional 30 min and the solid was dried under reduced pressure until it was free-flowing. This gave 186 g of catalyst.

(b) Polymerization

The polymerization was carried out in a 240 l autoclave, initially fed with 100 l Exxsol 140/170 (Exxson) while stirring at 150 rpm, at 75° C. 75 mmol triethylaluminium was added as scavenger in a solution of heptane. Three times a pressure of 2 bar ethylene was applied and released. Before adding the catalyst, 8 bar ethylene was applied. The catalyst (14.1 g) was added at 73° C. as a suspension in heptane under nitrogen. The ethylene pressure was increased to 11 bar and the temperature to 75° C. during polymerization. Comonomer hexene was added continuously. After 3 hours, the polymerization was stopped by releasing the pressure. The suspension was discharged through the discharging valve and filtered. The product was dried and 15.6 kg of polymer was obtained.

The composition had the properties illustrated in Table 3.

TABLE 3

|  | Example 16 |
| --- | --- |
| Density [g/cm$^3$] | 0.945 |
| MFR ($^{190}/_{21.6}$) [g/10 min] | 1.5 |
| $M_w$ [g/mol] | 591 000 |
| $M_w/M_n$ | 14.9 |
| Ethylene [bar] | 10.8 |
| Hexene [ml] | 1200 |
| Hexene [mol %] | 0.3 |
| Vinyl groups [$^1/_{1000}$ C atoms] | 0.33 |
| I.V. [dl/g] | 5.5 |
| Productivity [g PE/g cat] | 1100 | where
density is the polymer density determined in accordance with standard DIN EN ISO 1183-1, variant A,
MFR (190/21.6) is the melt flow rate according to standard ISO 1133, condition G,
$M_w$ is the weight average molar mass, $M_n$ is the number average molar mass. They were determined as described with reference to Table 1;
the content of vinyl groups/1000 carbon atoms is determined by means of IR, ASTM D 6248-98;
I.V. is the intrinsic viscosity, i.e. the limit value of the viscosity number obtained by extrapolation at concentration zero. It was measured at 135° C. by means of an automatic Ubbelohde viscosimeter (Lauda PVS 1) with decaline as suspending agent, in accordance with standard ISO 1628;
the productivity is the ratio of the amount of polymer in g and the amount of catalyst system in g.

EXAMPLE 17

Invention a) Preparation of the Mixed Catalyst System

A mixture of 0.36 g (0.684 mmol) of 2,6-diacetylpyridinbis (2,4,6-trimethylphenylanil)iron dichloride prepared according to the above-mentioned procedure under Example 1, a1), 0.505 g (0.833 mmol) of 2,6-diacetylpyridinbis(2,4-dichloro- 6-methylphenylanil) iron dichloride prepared according to the above-mentioned procedure under Example 1, a2), 4.1 g (8.336 mmol) of bis(n-butylcyclopentadienyl)hafnium dichloride, commercially available from Crompton, and 187 ml MAO (4.75 M in toluene, 0.888 mol) were stirred at ambient temperature for 30 minutes and subsequently, namely within 15 minutes, added, while stirring, to a suspension of 139.2 g of Sylopol 2107® at 0° C. (calcinated at 600° C. for 6 hours according to the procedure under Example 3, a)) ((ΣFe+Hf):Al=1:90). Then the catalyst was stirred at ambient temperature for 2 hours and the solid was dried under reduced pressure until it was free-flowing. This gave 325 g of catalyst. The obtained catalyst contained 39 wt.-% solvent (with reference to the total weight) and had a bulk density of 567 g/l.

(b) Polymerization and Granulation

The polymerization was carried out in a fluidized-bed reactor having a diameter of 0.5 m in the presence of the mixed catalyst system described above. The reaction temperature was 94° C., the pressure in the reactor was 20 bar, the flow rates of gas were 5.6 kg/h ethylene and 56 g/h 1-hexene. The reaction gas had the following composition: 40 vol % ethylene, 2 vol % hexane, 40 vol % propane, 18 vol % nitrogen. The output of 4.4 kg/h, 0.1 g of triisobutylaluminum per hour were metered in each case.

The multimodal polyethylene composition so obtained had a density of 0.953 g/cm$^3$ and a MFR (190/21.6) of 38 g/10 min. The composition had the properties illustrated in Table 4.

The polyethylene composition of Example 17 was homogenized and granulated in a ZSK 240 extruder (commercially available from Werner & Pfleiderer) with gear pump and screw having a length of 3420 mm and a L/d ratio of 14.25. No sieves were used. The processing temperature was 240° C., the screw speed 230 rotations/min, with maximum output of 9 t/h.

TABLE 4

|  | Example 17 |
| --- | --- |
| Density [g/cm$^3$] | 0.953 |
| MFR ($^{190}/_{21.6}$) [g/10 min] | 38 |
| Eta(vis)/Eta(GPC) | 1.0 |
| M$_w$ [g/mol] | 150 000 |
| M$_w$/M$_n$ | 11.8 |
| M$_z$ | 660 000 |
| GPC % at molar mass 1Mio | 98.4 |
| Hexene [mol %] | 0.45 |
| Vinyl groups [1/1000 C atoms] | 1.44 | where
 density is the polymer density determined in accordance with standard DIN EN ISO 1183-1, variant A,
 MFR (190/21.6) is the melt flow rate according to standard ISO 1133, condition G,
 Eta(vis) is the intrinsic viscosity as determined according to ISO 1628-1 and
 Eta(GPC) is the viscosity as determined by GPC according to DIN 55672, with 1,2,4-Trichlorobenzene, at 140° C.
 M$_w$ is the weight average molar mass, M$_n$ is the number average molar mass, M$_z$ is the z-average molar mass. They were determined as described with reference to Table 1;
 GPC % at molar mass 1 Mio is the % by weight according to gel permeation chromatography below a molar mass of 1 Mio g/mol;
 the content of vinyl groups/1000 carbon atoms is determined by means of IR, ASTM D 6248-98.

EXAMPLES 18 and 19

Comparative

The following commercial polyethylenes were tested as comparative examples: Hostalen GF 9055 F and Hostalen GD 9550 F, both high density bimodal polyethylenes prepared by the use of a Ziegler-Natta catalyst commercially available from Basell in granulated form. The ethylene polymers of the comparative examples 17 and 18 had the properties illustrated in Table 5.

TABLE 5

|  | Example 18 | Example 19 |
| --- | --- | --- |
| Density [g/cm$^3$] | 0.954 | 0.950 |
| MFR ($^{190}/_{21.6}$) [g/10 min] | 24 | 34 |
| Eta(vis)/Eta(GPC) | 0.9 | 1.0 |
| M$_w$ [g/mol] | 190 000 | 150 000 |
| M$_w$/M$_n$ | 10.7 | 8.4 |
| M$_z$ | 1 050 000 | 650 000 |
| GPC % at molar mass 1Mio | 96.9 | 98.3 | where the properties have the same meaning as in Table 4.

Examples 20-22

Film Extrusion

Each polyethylene composition of the Examples 17-19 above was extruded into films by blown film extrusion on an Alpine HS 50 S film extruder containing a HK 300 cooling ring and equipped with an iris diaphragm having a height of 1450 mm and a collapsing device with wooden flatted boards.

The diameter of the ring die was 120 mm, the gap width was 1 mm. The 21D Extruder with a screw diameter of 50 mm and a screw speed of 94 turns per min gave an output of 50 kg/h. The blow-up ratio was 1:2.65 and the haul-off speed 31 m/min. The height of the frost line was 300 mm. Melt temperatures were between 195° C. and 205° C., melt pressures between 180 and 200 bars behind a sieve with a medial mesh size of 0.5 mm and 204 meshes per cm$^2$. Films with a thickness in the order of 30 μm were obtained. The processing properties and optical and mechanical properties of the film made of the composition of the invention (Example 20, referring to the composition of Example 17) vs. those of the films made of the prior art composition (Examples 21 and 22, referring to the compositions of Example 18 and, respectively, 19) are summarized in Table 6.

TABLE 6

|  | Example 20 (invention) | Example 21 (comparative) | Example 22 (comparative) |
| --- | --- | --- | --- |
| WVTR [g/m$^2$ d] | 3.4 | 6.1 | 4.2 |
| Dart drop impact [g] | 60 | 30 | 40 |
| Elmendorf tear resistance MD [mN] | 430 | 200 | 240 |
| Elmendorf tear resistance TD [mN] | 6640 | 1900 | 1950 | where
 WVTR is the water vapor transmission rate according to standard DIN 53122 T. 2..
 Dart drop impact was determined according to standard ASTM D 1709, Method A on film samples having a thickness of 30 μm prepared by means of a blown film process in which the film is extruded according to the long-stalk process.

The Elmendorf tear resistance in machine direction (MD) ans in transverse direction (TD) was Determined by the tear propagation test performed according to ISO 63832.

The invention claimed is:

1. A polyethylene composition comprising at least three ethylene polymer fractions comprising:
   a) at least one first ethylene polymer fraction having:
      a1) a first molecular weight,
      a2) a first comonomer content lower than or equal to 0.3 mol %, and
      a3) a first density comprised between 0.950 and 0.986 g/cm$^3$;
   b) at least one second ethylene polymer fraction having:
      b1) a second molecular weight higher than said first molecular weight,
      b2) a second comonomer content higher than 0.3 mol %, and
      b3) a second density comprised between 0.880 and 0.960 g/cm$^3$;
   c) at least one third ethylene polymer fraction having:
      c1) a third molecular weight higher than said first molecular weight,
      c2) a third comonomer content lower or equal than 0.3 mol %, and
      c3) a third density comprised between 0.940 and 0.975 g/cm$^3$;

each one of said mol % of the first, second and third comonomer content being based on the total comonomer content of the composition, wherein said at least one first ethylene polymer fraction and said at least one third ethylene polymer fraction are prepared by the use of a first catalyst and, respectively, of a third catalyst and said at least one second ethylene polymer fraction is prepared by the use of a second catalyst, the second catalyst being of the single site catalyst, the polyethylene composition having an Mw/Mn of 11 to 18 wherein the at least one first ethylene polymer fraction, the at least one second ethylene polymer fraction, and the at least one third ethylene polymer fraction are polymerized in a single step polymerization process in the gas phase.

2. The polyethylene composition according to claim 1, wherein each of said first catalyst and of said third catalyst is of the non-single site type.

3. The polyethylene composition according to claim 2, wherein each of said first catalyst and of said third catalyst comprises a late transition metal complex selected from the groups 8-10 of the Periodic Table of Elements.

4. The polyethylene composition according to claim 1, wherein said at least one first ethylene polymer fraction, said at least one second ethylene polymer fraction and said at least one third ethylene polymer fraction have a first polydispersity Mw/Mn$_1$ from 2 to 10, a second polydispersity Mw/Mn$_2$ lower than 5 and, respectively, a third polydispersity Mw/Mn$_3$ greater than 8.

5. A film comprising a polyethylene composition according to claim 1.

6. The film according to claim 5, having a water vapor transmission rate (WVTR) lower than 4 g/m$^2$ d when measured at a temperature of 38° C. and at a relative humidity (RH) of 90% according to standard DIN 53122, T.2, on 30 ).lm films.

* * * * *